(12) United States Patent
Ingerman et al.

(10) Patent No.: US 10,481,878 B2
(45) Date of Patent: Nov. 19, 2019

(54) USER INTERFACE APPARATUS AND METHODS

(75) Inventors: Mark Ingerman, Newton, MA (US); Patrick Curley, Winchester, MA (US)

(73) Assignee: OBJECTSTORE, INC., Austin, TX (US)

( * ) Notice: Subject to any disclaimer, the term of this patent is extended or adjusted under 35 U.S.C. 154(b) by 488 days.

(21) Appl. No.: 12/576,027

(22) Filed: Oct. 8, 2009

(65) Prior Publication Data

US 2010/0094805 A1      Apr. 15, 2010

Related U.S. Application Data

(60) Provisional application No. 61/104,211, filed on Oct. 9, 2008.

(51) Int. Cl.
| G06F 7/00 | (2006.01) |
| G06F 8/35 | (2018.01) |
| G06F 16/78 | (2019.01) |

(52) U.S. Cl.
CPC ............... *G06F 8/35* (2013.01); *G06F 16/78* (2019.01)

(58) Field of Classification Search
CPC ...................................................... G06F 16/78
USPC ........................................ 707/705, 713, 781
See application file for complete search history.

(56) References Cited

U.S. PATENT DOCUMENTS

| 4,701,130 A | 10/1987 | Whitney et al. |
| 4,895,518 A | 1/1990 | Arnold et al. |
| 4,953,106 A | 8/1990 | Gansner et al. |
| 5,119,465 A | 6/1992 | Jack et al. |
| 5,129,043 A | 7/1992 | Yue |
| 5,199,068 A | 3/1993 | Cox |
| 5,259,766 A | 11/1993 | Sack et al. |
| 5,267,865 A | 12/1993 | Lee et al. |
| 5,270,920 A | 12/1993 | Pearse et al. |
| 5,301,270 A | 4/1994 | Steinberg et al. |
| 5,310,349 A | 5/1994 | Daniels et al. |
| 5,311,422 A | 5/1994 | Loftin et al. |

(Continued)

FOREIGN PATENT DOCUMENTS

| EP | 1132847 | 9/2001 |
| GB | 2343763 A | 5/2000 |

(Continued)

OTHER PUBLICATIONS

"An Overview of the NEDSS Initiative", website for the Centers for Disease Control and Prevention, http://www.cdc.gov/nedss/About/overview.html, printed Nov. 14, 2005, 2 pages.

(Continued)

*Primary Examiner* — Eliyah S. Harper

(57) ABSTRACT

In one aspect, the invention provides a digital data processing system for information storage and retrieval that includes a first digital data processor (e.g., personal computer, workstation, server, mainframe, etc.) coupled to a second digital data processor and a data store (e.g., a RDF data store, relational database, etc.). The first digital data processor creates, reads, updates and/or deletes data from the data store (i.e., "CRUD" operations) based on a model generated by the first digital data processor. The model comprises an ontology and a set of constraints that are applied to data characterized by the ontology.

51 Claims, 12 Drawing Sheets

(56) References Cited

U.S. PATENT DOCUMENTS

| | | |
|---|---|---|
| 5,326,270 A | 7/1994 | Ostby et al. |
| 5,333,254 A | 7/1994 | Robertson |
| 5,339,390 A | 8/1994 | Robertson et al. |
| 5,374,932 A | 12/1994 | Wyschogrod et al. |
| 5,379,387 A | 1/1995 | Carlstedt et al. |
| 5,381,332 A | 1/1995 | Wood |
| 5,395,243 A | 3/1995 | Lubin et al. |
| 5,421,730 A | 6/1995 | Lasker, III et al. |
| 5,450,480 A | 9/1995 | Man et al. |
| 5,463,682 A | 10/1995 | Fisher et al. |
| 5,499,293 A | 3/1996 | Behram et al. |
| 5,519,618 A | 5/1996 | Kastner et al. |
| 5,548,506 A | 8/1996 | Srinivasan |
| 5,579,486 A | 11/1996 | Oprescu et al. |
| 5,597,312 A | 1/1997 | Bloom et al. |
| 5,608,789 A | 3/1997 | Fisher et al. |
| 5,634,053 A | 5/1997 | Noble et al. |
| 5,655,118 A | 8/1997 | Heindel et al. |
| 5,732,192 A | 3/1998 | Malin et al. |
| 5,745,753 A | 4/1998 | Mosher, Jr. |
| 5,761,063 A | 6/1998 | Jannette et al. |
| 5,765,140 A | 6/1998 | Knudson et al. |
| 5,788,504 A | 8/1998 | Rice et al. |
| 5,795,155 A | 8/1998 | Morrel-Samuels |
| 5,809,212 A | 9/1998 | Shasha |
| 5,822,780 A | 10/1998 | Schutzman |
| 5,826,077 A | 10/1998 | Blakeley et al. |
| 5,826,252 A | 10/1998 | Wolters, Jr. et al. |
| 5,829,983 A | 11/1998 | Koyama et al. |
| 5,832,483 A | 11/1998 | Barker |
| 5,841,673 A | 11/1998 | Kobayashi et al. |
| 5,873,076 A | 2/1999 | Barr et al. |
| 5,875,441 A | 2/1999 | Nakatsuyama et al. |
| 5,881,269 A | 3/1999 | Dobbelstein |
| 5,907,837 A | 5/1999 | Ferrel et al. |
| 5,935,249 A | 8/1999 | Stern et al. |
| 5,974,441 A | 10/1999 | Rogers et al. |
| 5,974,443 A | 10/1999 | Jeske |
| 5,983,267 A | 11/1999 | Shklar et al. |
| 5,987,415 A | 11/1999 | Breese et al. |
| 5,995,958 A | 11/1999 | Xu |
| 6,012,098 A | 1/2000 | Bayeh et al. |
| 6,035,412 A | 3/2000 | Tamer et al. |
| 6,044,373 A | 3/2000 | Gladney et al. |
| 6,044,466 A | 3/2000 | Anand et al. |
| 6,078,982 A | 6/2000 | Du et al. |
| 6,085,188 A | 7/2000 | Bachmann et al. |
| 6,094,652 A | 7/2000 | Faisal |
| 6,122,632 A | 9/2000 | Botts et al. |
| 6,125,363 A | 9/2000 | Buzzeo et al. |
| 6,130,679 A | 10/2000 | Chen et al. |
| 6,137,797 A | 10/2000 | Bass et al. |
| 6,144,997 A | 11/2000 | Lamming et al. |
| 6,151,595 A | 11/2000 | Pirolli et al. |
| 6,151,624 A | 11/2000 | Teare et al. |
| 6,154,738 A | 11/2000 | Call |
| 6,177,932 B1 | 1/2001 | Galdes et al. |
| 6,182,085 B1 | 1/2001 | Eichstaedt et al. |
| 6,185,516 B1 | 2/2001 | Hardin et al. |
| 6,185,534 B1 | 2/2001 | Breese et al. |
| 6,212,502 B1 | 4/2001 | Ball et al. |
| 6,240,417 B1 | 5/2001 | Eastwick et al. |
| 6,243,713 B1 | 6/2001 | Nelson et al. |
| 6,246,320 B1 | 6/2001 | Monroe |
| 6,266,668 B1 | 7/2001 | Vanderveldt et al. |
| 6,308,163 B1 | 10/2001 | Du et al. |
| 6,330,554 B1 | 12/2001 | Altschuler et al. |
| 6,341,277 B1 | 1/2002 | Coden et al. |
| 6,360,330 B1 | 3/2002 | Mutalik et al. |
| 6,369,819 B1 | 4/2002 | Pitkow et al. |
| 6,380,910 B1 | 4/2002 | Moustakas et al. |
| 6,381,738 B1 | 4/2002 | Choi et al. |
| 6,389,429 B1 | 5/2002 | Kane et al. |
| 6,389,460 B1 | 5/2002 | Stewart et al. |
| 6,393,423 B1 | 5/2002 | Goedken |
| 6,396,885 B1 | 5/2002 | Ding et al. |
| 6,405,211 B1 | 6/2002 | Sokol et al. |
| 6,405,251 B1 | 6/2002 | Bullard et al. |
| 6,415,283 B1 | 7/2002 | Conklin |
| 6,418,413 B2 | 7/2002 | DeMarcken et al. |
| 6,418,448 B1 | 7/2002 | Sarkar |
| 6,426,723 B1 | 7/2002 | Smith et al. |
| 6,427,151 B1 | 7/2002 | Chan et al. |
| 6,429,870 B1 | 8/2002 | Chen et al. |
| 6,437,799 B1 | 8/2002 | Shinomi et al. |
| 6,446,200 B1 | 9/2002 | Ball et al. |
| 6,446,256 B1 | 9/2002 | Hyman et al. |
| 6,463,440 B1 | 10/2002 | Hind et al. |
| 6,473,467 B1 | 10/2002 | Wallace et al. |
| 6,493,331 B1 | 12/2002 | Walton et al. |
| 6,493,399 B1 | 12/2002 | Xia et al. |
| 6,496,833 B1 | 12/2002 | Goldberg et al. |
| 6,509,898 B2 | 1/2003 | Chi et al. |
| 6,529,899 B1 | 3/2003 | Kraft et al. |
| 6,530,079 B1 | 3/2003 | Choi et al. |
| 6,539,374 B2 | 3/2003 | Jung |
| 6,542,912 B2 | 4/2003 | Meltzer et al. |
| 6,546,406 B1 | 4/2003 | DeRose et al. |
| 6,556,983 B1 | 4/2003 | Altschuler et al. |
| 6,571,222 B1 | 5/2003 | Matsumoto et al. |
| 6,577,769 B1 | 6/2003 | Kenyon et al. |
| 6,583,800 B1 | 6/2003 | Ridgley et al. |
| 6,594,662 B1 | 7/2003 | Sieffert et al. |
| 6,598,043 B1 | 7/2003 | Baclawski |
| 6,606,613 B1 | 8/2003 | Altschuler et al. |
| 6,625,657 B1 | 9/2003 | Bullard |
| 6,636,848 B1 | 10/2003 | Aridor et al. |
| 6,640,284 B1 | 10/2003 | Shaw et al. |
| 6,643,638 B1 | 11/2003 | Xu |
| 6,643,652 B2 | 11/2003 | Helgeson et al. |
| 6,678,679 B1 | 1/2004 | Bradford |
| 6,701,314 B1 | 3/2004 | Conover et al. |
| 6,721,747 B2 | 4/2004 | Lipkin |
| 6,725,227 B1 | 4/2004 | Li |
| 6,751,663 B1 | 6/2004 | Farrell et al. |
| 6,754,475 B1 | 6/2004 | Harrison et al. |
| 6,757,708 B1 | 6/2004 | Craig et al. |
| 6,771,706 B2 | 8/2004 | Ling et al. |
| 6,772,148 B2 | 8/2004 | Baclawski |
| 6,778,971 B1 | 8/2004 | Altschuler et al. |
| 6,785,341 B2 | 8/2004 | Walton et al. |
| 6,792,420 B2 | 9/2004 | Stephen Chen et al. |
| 6,804,688 B2 | 10/2004 | Kobayashi et al. |
| 6,856,992 B2 | 2/2005 | Britton et al. |
| 6,901,438 B1 | 5/2005 | Davis et al. |
| 6,925,457 B2 | 8/2005 | Britton et al. |
| 6,927,728 B2 | 8/2005 | Vook et al. |
| 6,934,702 B2 | 8/2005 | Faybishenko et al. |
| 6,940,917 B2 | 9/2005 | Menon et al. |
| 6,954,749 B2 | 10/2005 | Greenblatt et al. |
| 6,963,875 B2 | 11/2005 | Moore et al. |
| 7,027,055 B2 * | 4/2006 | Anderson ............. G06F 11/328 |
| | | 345/473 |
| 7,047,411 B1 | 5/2006 | DeMello et al. |
| 7,058,367 B1 | 6/2006 | Luo et al. |
| 7,058,637 B2 | 6/2006 | Britton et al. |
| 7,117,260 B2 | 10/2006 | Bimson et al. |
| 7,171,145 B2 | 1/2007 | Takeuchi et al. |
| 7,171,415 B2 | 1/2007 | Kan et al. |
| 7,289,793 B2 | 10/2007 | Norwood et al. |
| 7,302,440 B2 | 11/2007 | Britton et al. |
| 7,313,588 B1 | 12/2007 | Shotton, Jr. et al. |
| 7,318,055 B2 | 1/2008 | Britton et al. |
| 7,505,989 B2 * | 3/2009 | Gardner ................ G06F 16/367 |
| 7,613,712 B2 | 11/2009 | Greenblatt et al. |
| 7,640,239 B2 | 12/2009 | Britton et al. |
| 7,676,489 B2 * | 3/2010 | Kaiser ................. G06F 17/2785 |
| | | 707/999.102 |
| 7,716,056 B2 * | 5/2010 | Weng ..................... G10L 15/22 |
| | | 704/10 |
| 8,112,416 B2 * | 2/2012 | Liu ....................... G06F 16/335 |
| 8,335,778 B2 * | 12/2012 | Ghosh ................... G06F 16/367 |
| | | 707/708 |

(56) References Cited

U.S. PATENT DOCUMENTS

| | | | |
|---|---|---|---|
| 8,392,483 B2* | 3/2013 | Lawrence | G06F 16/36 |
| | | | 707/899 |
| 8,612,208 B2* | 12/2013 | Cooper | G06F 17/2735 |
| | | | 704/9 |
| 8,768,923 B2* | 7/2014 | Drumm | G06F 16/951 |
| | | | 707/736 |
| 9,092,522 B2* | 7/2015 | Altenhofen | G06F 16/95 |
| 9,298,855 B2* | 3/2016 | Aggarwal | G06T 11/60 |
| 2001/0047355 A1 | 11/2001 | Anwar | |
| 2002/0042831 A1 | 4/2002 | Capone et al. | |
| 2002/0049603 A1 | 4/2002 | Mehra et al. | |
| 2002/0049788 A1 | 4/2002 | Lipkin et al. | |
| 2002/0059566 A1 | 5/2002 | Delcambre et al. | |
| 2002/0069134 A1 | 6/2002 | Solomon | |
| 2002/0078030 A1 | 6/2002 | Iwayama et al. | |
| 2002/0091678 A1 | 7/2002 | Miller et al. | |
| 2002/0091710 A1 | 7/2002 | Dunham et al. | |
| 2002/0091835 A1 | 7/2002 | Lentini et al. | |
| 2002/0118688 A1 | 8/2002 | Jagannathan | |
| 2002/0120598 A1 | 8/2002 | Shadmon et al. | |
| 2002/0133502 A1 | 9/2002 | Rosenthal et al. | |
| 2002/0143759 A1 | 10/2002 | Yu | |
| 2002/0177232 A1 | 11/2002 | Melker et al. | |
| 2002/0178232 A1 | 11/2002 | Ferguson | |
| 2003/0004934 A1 | 1/2003 | Qian | |
| 2003/0009239 A1 | 1/2003 | Lombardo et al. | |
| 2003/0014399 A1 | 1/2003 | Hansen et al. | |
| 2003/0037145 A1 | 2/2003 | Fagan | |
| 2003/0050834 A1 | 3/2003 | Caplan | |
| 2003/0050927 A1 | 3/2003 | Hussam | |
| 2003/0050929 A1 | 3/2003 | Bookman et al. | |
| 2003/0061209 A1 | 3/2003 | Raboczi et al. | |
| 2003/0074352 A1 | 4/2003 | Raboczi et al. | |
| 2003/0074369 A1 | 4/2003 | Scheutze et al. | |
| 2003/0088639 A1 | 5/2003 | Lentini et al. | |
| 2003/0109951 A1 | 6/2003 | Hsiung et al. | |
| 2003/0182310 A1* | 9/2003 | Charnock | G06Q 10/10 |
| 2003/0208499 A1 | 11/2003 | Bigwood et al. | |
| 2003/0229529 A1 | 12/2003 | Mui et al. | |
| 2004/0034651 A1 | 2/2004 | Gupta et al. | |
| 2004/0054690 A1 | 3/2004 | Hillerbrand et al. | |
| 2005/0027563 A1 | 2/2005 | Fackler et al. | |
| 2005/0055330 A1 | 3/2005 | Britton et al. | |
| 2005/0060372 A1 | 3/2005 | DeBettencourt et al. | |
| 2005/0125683 A1 | 6/2005 | Matsuyama et al. | |
| 2006/0036620 A1 | 2/2006 | Bigwood et al. | |
| 2006/0053135 A1* | 3/2006 | Beaumont | G16B 5/00 |
| 2006/0218123 A1* | 9/2006 | Chowdhuri | G06F 17/30445 |
| 2006/0271563 A1 | 11/2006 | Angelo et al. | |
| 2006/0277227 A1 | 12/2006 | Britton et al. | |
| 2007/0078815 A1* | 4/2007 | Weng | G06F 16/243 |
| 2007/0081197 A1* | 4/2007 | Omoigui | G06F 16/24575 |
| | | | 358/403 |
| 2008/0109420 A1 | 5/2008 | Britton et al. | |
| 2008/0109485 A1 | 5/2008 | Britton et al. | |
| 2008/0195591 A1* | 8/2008 | Lei | G06Q 30/02 |

FOREIGN PATENT DOCUMENTS

| | | |
|---|---|---|
| WO | WO-9722096 | 6/1997 |
| WO | WO-9805018 | 2/1998 |
| WO | WO-9810399 | 3/1998 |
| WO | WO-9824020 | 6/1998 |
| WO | WO-9927460 | 6/1999 |

OTHER PUBLICATIONS

"Background on Public Health Surveillance", website for the Centers for Disease Control and Prevention, http://www.cdc.gov/nedss/About/purpose.htm, printed Nov. 14, 2005, 3 pages.

"Description of the NEDSS Base System," Mar. 28, 2001, 5 pages.

"Inkling: RDF Query Using SquishQL," downloaded from http://swordfish.rdfweb.org/rdfquery/ on Mar. 20, 2003, 2 pages.

"MaestroTM Public Health Suite," Orion International website, http://www.orionhealth.com/maestro_overview.htm, printed Jan. 18, 2005, 3 pages.

"National Electronic Disease Surveillance System (NEDSS): A standards-Based Approach to Connect: Public Health and Clinical Medicine", J. Public Health Management Practice, 2001. 7(6], 43-508 pages.

"NEDSS and NEDSS PAMs Business Discovery Statement", Version 1.2, Mar. 9, 2002, 23 pages.

"NEDSS Base System Fact Sheet", website for the Centers for Disease Control and Prevention, 2 pages, Apr. 25, 2001.

"Nedss Logical Data Model (NLDM) Overview and Users' Guide", Version 1.0, 92 pages, Feb. 13, 2002.

"NEDSS Systems Architecture", Version 2.0, Apr. 15, 2001, 5 pages.

"Overview of PHIN", Centers for Disease Control and Prevention website, http://www.cdc.gov/phin, printed Jan. 18, 2005, 3 pages.

"rdfDB Query Language," downloaded from http://www.guha.com/rdfdb/query.html on Mar. 20, 2003, 4 pages.

"RDQL—RDF Data Query Language," Hewlett-Packard Company, .COPYRGT. 1994-2003, downloaded from http://www.hpl.hp.com/semweb/rdql.htm on Mar. 20, 2003, 3 pages.

"The Rete Algorithm," http://herzberg.ca.sandia.gov/jess/docs/52/rete.html, 3 pages, downloaded on Feb. 20, 2003.

"The Surveillance and Monitoring Component of the Public Health Information Network", website for the Centers for Disease Control and Prevention, http://www.cdc.gov/nedss, printed Nov. 14, 2005, 2 pages.

Public Health Information Network, The Association of State and Territorial Health Officials website, http://www.astho.org/?template=public_health_info_network.html, printed Jan. 18, 2005, 2 pages.

Amann, B. et al., "Integrating Ontologies and Thesauri for RDF Schema Creation and Metadata Querying" Mar. 6, 2001.

Beckett, D. "The Design and Implementation of the Redland RDF Application Framework," Copyright WWW01 May 2-5, 2001. Retrieved from http:www10.org/cdrom/papers/490/.

Beckett, Dave Dave Beckett's Resource Description Framework (RDF) Resource Guide, available at http://planetrdf.com/guide, last updated Sep. 23, 2005, 26 pages.

Berners-Lee et al "Web Architecture: Describing and Exchanging Data," W3C Recommendations, Jun. 7, 1999, http://www.w3.org/1999/06/07-WebData.

Berners-Lee, "Semantic Web Road Map," W3C Recommendations, Sep. 1998, http://www.w3.org/DesignIssues/Semantic.html.

Berners-Lee, "What a semantic web can represent," W3C Recommendations, Sep. 1998.

Berners-Lee, Tim "Information Management: A Proposal," Mar. 1989, May 1990; 14 pages.

Berniers-Lee et al, "The Enquire Manual," Oct. 1980, http://infomesh.net/2001/enriquire/manual/.

Berniers-Lee et al. RFC 2396: Uniform Resource Identifiers (URI): Generic Syntax (Aug. 1998) http://www.cs.tut.fi/.about.jkorpela/rfc/2396/full.html, 23 pages, downloaded on Feb. 20, 2003.

Bonifati, "Comparative Analysis of Five XML Query Languages," SIGMOD Record, vol. 29, No. 1, Mar. 2000.

Bray, Tim et al. "Extensible Markup Language," W3C Recommendations, Feb. 10, 1998, http://www.w3.org/TR/1998/REC-xml-19980210.

Brickley, Dan "RDF Query in Javascript demo," W3C website, Jul. 28, 2001, http://www.w3.org/1999/11/11-WWWProposal/rdfqdemo.html.

Brickley, Dan "Semantic Web History: Nodes and Arcs 1989-1999," The WWW Proposal and RDF, revised Mar. 2001 http:www.w3.org/1999/11/11-WWWProposal/.

Brickley, Dan et al. "SWIPE 0.1 specification" Pub. 2001. Retrieved from: http:rdfweb.org/2001/01/swipe/.

Brickley, Dan et al., "RDF, squish etc." Pub on the web Nov. 26, 2000. Retrieved from http://www.ilrt.bris.ac.uk/discovery/2000/111/QL/QL.txt.

Bucher, Alex et al. "Discovering Internet Marketing Intelligence through Online Analytical Web Usage Mining," SIGMOD Record, vol. 27, No. 4, Dec. 1998.

(56) References Cited

OTHER PUBLICATIONS

Buneman et al "Interaction between Path and Type Constraints" PODS 1999, pp. 56-67.
Card et al., "Readings in Information Visualizing Using Vision to Think", 1999, Morgan Kaufmann, p. 298.
Carr, Leslie et al. "The Evolution of Hypertext Link Services," ACM Computing Surveys, vol. 31, No. 4es, Dec. 1999.
Chen, James et al "A Distributed Multi-Agent System for Collaborative Information Management and Sharing," RBAC 2000, Berlin, Germany ISBN 1-58113-259-x/00/07; 2000.
Churchill, R. et al. "RDT Technical Overview" Mozilla.org. Last modified 11, 1999. Retrieved from http://www.mozill.org/rdf/doc/api.html.
Clark, James Editor "XSL Transformations," W3C Recommendations, Nov. 16, 1999, http://www.w3.org/TR/xslt.
Cowan, John et al. "XML Information Set," W3C Recommendations, May 17, 1999, http://www.w3.org/TR/1999/WD-xml-infoset-19990517.
Crestani, Fabio "Vocal Access to a Newspaper Archive: Design Issues and Preliminary Investigations," International Computer Science Institute; Mar. 1999.
Dublin Core Metadata Initiative, available at http://dublincore.org, web page last updated Mar. 31 2009, copyright 1995-2009; 1 page.
Extensible Markup Language (XML), W3C Sematic Web, http://www.w3.org/XML/ ; last updated Apr. 5, 2009; copyright 1996-2003; 5 pages.
Extensible Markup Language Activity Statement , W3C Ubiquitous Web, http://www.w3.org/XML/Activity; downloaded Apr. 10, 2009; 3 pages.
Fan, Wenfei, "Integrity Constraints for XML," ACM Symposium on Principles of Database Systems archive Proceedings of the nineteenth ACM SIGMOD-SIGACT-SIGART symposium on Principles of database systems; Dallas, Texas, United States; pp. 23-34 ; Year of Publication: 2000.
Fensel, D. "Ontobroker: Or How to Enable Intelligent Access to the WWW," Proceedings of the 11$^{th}$ Banff Knowledge Acquisition for Knowledge-Based System Workshop (KAW98), Banaff, Kanada, Apr. 1998.
Forgy, Charles L. "Rete: A Fast Algorithm for the Many Pattern/Many Object Pattern Match Problem," Artifical Intelligence vol. 19 (1982) pp. 17-37.
Frank Manola, "Towards a Richer Object Model", SIGMOD Record, vol. 27, No. 1, Mar. 1998, 6 pages.
Gandon, Fabien et al. "A Multi-Agent System to Support Exploiting an XML-based Corporate Memory" INRIA, ACACI Project, 2004 Route des Lucioles, 06902 Sophia Antipolis, France, Proc. of the Third Int. Conf. On Practical Aspects of Knowledge Management (PAKM2000) Basel, Swwitzerland, Oct. 30-31, 2000, (U.Reimer, ed.).
Grant, J and Beckett, D. "RDF Test Cases," W3C Recommendations, Dec. 2003, http://www.w3.org/TR/2003/PR-rdf-testcases-20031215/.
Gray, M., "Semantic Labeling" HIVE. May 14, 1999. Retrieved from: htttp://hive.sourceforge.net/mkgray-thesis/html/node8.html.
Halpin, Harry et al "W3C Semantic Web Activity," W3C Sematic Web, http://www.w3.org/2001/sw/; last updated Apr. 6, 2009, copyright 1994-2009.
Hayes, Patrick Editor "RDF Semantic," W3C Recommendation, Feb. 2004, http://www.w3.org/TR/2004/REC-rdf-mt-20040210/.
Jenkins, C. et al., "Automatic RDF Metadata Generation for Resource," Computer Networks, 1999.
Karvounarakis, G. et al., "Querying Community Web Portals" Pub. 2000.
Kerschberg, L. "Knowledge Management in Heterogenous Data Warehouse Environments," Pub. 2001.
Kerstin Forsberg et al. Extensible use of RDF in a business context. Computer Networks 33 (2000), pp. 347-364: The International Journal of Computer and Telecommunications Networking . Published Jun. 2000.

Lassila, et al "Resource Description Framework (RDF) Model and Syntax Specification," W3C Recommendations, Feb. 22, 1999.
Lois Delcambre et al., "Bundles in Captivity: An Application of Superimposed Information", IEEE 2001, pp. 111-120.
Ludascher, B. Gupta, A. Martone, M.E.Model-based mediation with domain maps. Data Engineering, 2001. Proceedings. 17th International Conference on Publication Date: 2001. pp. 81-90. Meeting Date: Apr. 2-6, 2001.
M. R. Kogalovsky. Systematization of information resources collections in digital libraries. MAIK Nauka/Interperiodica distributed exclusively by Springer Science+Business Media LLC. vol. 26, No. 3 / May 2000, pp. 140-155.
Malhotra, Ashok et al., "XML Schema Requirements," W3C Note, Feb. 15, 1999, http://www.w3.org/TR/NOTE-xml-schema-req.
Manola, Frank Editor "RDF Primer," W3C Working Draft, Mar. 2002, http://www.w3.org/TR/2002/WD-rdf-primer-20020319/.
McGrath et al, "Digital Library Technology for Locating and Accessing Scientific Data," Internationalal Conference on Digital Libraries, Proceedings of the fourth ACM conference on Digital Libraries, Berkley, CA, United States, pp. 188-194, Year of Publication: 1999. ISBN: 1-58113-145-3.
Melnik, Sergey "Building a Distributed Full-Text Index of the Web," WWW10, May 1-5, 2001, Hong Kong ACM 1-58113-348-0/01/00005.
Melnik, Sergey "A Mediation Infrastructure for Digital Library Services," Digital Libraries, San Antonio, TX ACM 2000-581 13-231 x/00/0006; 2000.
Melnik, Sergey, "Storing RDF in a relational database," http://www-db.stanford.edu/ .about.melnik/rdf/db.html, 5 pages, downloaded on 20/20/2003.
Miller, Eric et al., RDF Primer, W3C @@ Editor's Draft Jan. 27, 2002 @@, Copyright 2001, 2002 (MIT,INRIA,Keio) (22 pages).
Miller, L., "Aggregating Recommendations Using RDF," ILRT. Org. Pub. Jan. 10, 1999.
Ouksel, Aris et al. "Semantic Interoperability in Global Information Systems," SIGMOD Record, vol. 28, No. 1, Mar. 1999.
Prudhommeaux, Eric "Check and Visualize you RDF," W3C website, Feb. 15, 2007, http://www.w3.org/RDF/Validator/.
Public Health Information Network Functions and Specifications, Version 1.2—Dec. 18, 2002; Draft; 56 pages.
Published International Search Report (published May 24, 2007) and Written Opinion (dated Feb. 12, 2007) for PCT/US05/005725.
Quinlan, J. R., "Induction of Decision Trees," Machine Learning vol. 1 (1986) pp. 18-106.
RDF Interest Group 1999-2004, available at W3C Semantic Web, http://www.w3.org/RDF/Interest/ ; last updated Dec. 8, 2005; downloaded Apr. 2009.
Resource Description Framework (RDF) Model and Syntax Specification W3C Recommendation (Feb. 22, 1999) http://www.w3.org.TR/1999/REC-rdf-syntax-19990222/, 34 pages, downloaded on Feb. 20, 2003.
Resource Description Framework, (RDF) Schema Specification, W3C Proposed Recommendation Mar. 3, 1999, http://www.w3.org/TR/1999/PR-rdf-schema-19990303/.
Rogers, N. "SWAD—Europe deliverable 4.2: Semantic Web and Web Services: RDF/XML and Soap for Web Data Encoding" Year 2001.
S. Alexaki et al. Managing RDF Metadata for Community Webs. Springer Berlin / Heidelberg. vol. 1921/2000, pp. 140-151.
Semantic Web Workshop 2001. Proceedings of the Second International Workshop on the Semantic Web. SemWeb'2001. S. Staab et al. Hong Kong, China, May 2001.
Semantic Web Workshop: Models, Architectures and Management, Sep. 21, 2000 Conference Review, Intelligence Summer 2001.
Sergey Melnik et al. Representing Order in RDF. Pub. Jan. 7, 2001. Retrieved from:http://infolab.stanfordedu/~stefan/daml/order.html.
Shankar, Ravi D. et al., "Epoch: an Ontological Framework to Support Clinical Trials Management", [1]Stanford Medical Informatics, Stanford University School of Medicine, Stanford, CA, USA, [2]The Immune Tolerance Network, Pittsburgh, PA, USA, pp. 25-32, Nov. 11, 2006, Copyright 2006.

(56) References Cited

OTHER PUBLICATIONS

Six, Janet, M. et al, "Effective e Graph Visualization Via Node Grouping", Proceedings of the IEEE Symposium on Information Visualization 2001 (INFOVIS'01) (8 pages).
Suciu, Dan "Managing Web Data," AT&T Labs-Research, SIGMOD 1999, ISSN:0163-5808.
Swick, R. "The Cambridge Communique," W3C Recommendations, Oct. 1999, http://www.w3.org/TR/schema-arch.
Swick, Ralph, "RDF:Weaving the Web of Discovery," Putting it Together, Jun. 1999, pp. 21-25, Year of Publication: 1999, ISSN:1091-3556.
Sycara, Katia et al. "Dynamic Service Matchmaking Among Agents in Open Information," SIGMOD Record, vol. 28, No. 1, Mar. 1999.
Takeda, Koichi, "Site Outlining," IBM Research, Tokyo Research Lab, 1623-14, May 1998.
Technical Reports and Communications, W3C website, http://www.w3.org/TR/; last updated Apr. 21, 2009; copyrighted 1994-2006.
Terence Critchlow. Report on XEWA-00: the XML enabled wide-area searches for bioinformatics workshop. ACM> vol. 30, Issue 1 (Mar. 2001).
Thomas Lee, et al "Information integration with attribution support for corporate profiles," Information integration with attribution support for corporate profiles, Conference on Information and Knowledge Management, Proceedings of the eighth international conference on Information and knowledge management, Kansas City, Missouri, United States ,pp. 423-429 ,Year of Publication: 1999 , ISBN:1-58113-146-1.
Thompson, Craig "Workshop on Compositional Software Architectures Workshop Report," Software Engineering Notes, vol. 23. No. 3, May 1998.
Tudhope et al "Semantically Indexed Hypermedia: Linking Information Disciplines," ACM 2000, www.comp.glam.ac.uk/people/staff/dstudhope.
Web site; http://www.w3.org/DesignIssues/RDFnot.html ; Sep. 27, 2004 ; 8 pages.
William A. Yasnoff et al., "Public health informatics: Improving and transforming public health in the information age" Topics in Health Information Management, Frederick; Aspen Publishers; Feb. 2001; 8 pages.
Supplementary European Search Report for App. No. 03728486.6, dated Aug. 21, 2007.
Sergey Melnik and Stefan Decker, "A Layered Approach to Information Modeling and Interoperability on the Web", Database Group, Stanford Univ., Sep. 4, 2000, 13 pages.
Dan Brickley and Libby Miller, "RDF, SQL and the Semantic Web—A Case Study", www.ilrt.org/discovery/2000/10/swsql/ , latest version Nov. 8, 2000 (initial draft Oct. 31, 2000), 8 pages.
Omelayenko, B., "Learning of Ontologies for the Web: the Analysis of Existent Approaches" Proceedings of the International Workshop on Web Dynamics Held in Conj. With The 8TH Internationsl Conference on Database Theory Jan. 3, 2001 pp. 1-10, XP002378744, London, UK.
Nick, Z.Z. et al., "Web Search Using a Genetic Algorithm" IEEE Internet Computing, vol. 5, No. 2, Mar. 2001, pp. 18-26, XP002378745, USA.
Supplemental European Search Report for European Application No. 02736950.3 dated May 19, 2006, 4 pages.
European Patent Office Communication Pursuant to Article 96(2) for European Applicaiton No. 02741744.2, dated Dec. 8, 2006, 12 pages.
International Search Report for International Appliaction No. PCT/US05/05725, dated Feb. 12, 2007, (9 pages).

\* cited by examiner

USER INTERFACE APPARATUS AND METHODS

This application claims the benefit of priority of U.S. Patent Application Ser. No. 61/104,211 filed Oct. 9, 2008, having the same title hereof, the teachings of which are incorporated herein by reference.

BACKGROUND OF THE INVENTION

The invention pertains to digital data processing and, more particularly, to methods and apparatus for facilitating digital data information storage and retrieval operations, e.g., data create, read, update, and delete operations.

In today's marketplace, many advanced data management systems focus on providing back-end support for data storage and retrieval. They are generally geared towards developers, who use Application Programming Interfaces (APIs) supplied with the packages to write "one-off" applications (e.g., with Java Swing) that permit users to create, access, delete and otherwise "interface" with the data. While this facilitates (and, indeed, necessitates) customization, a drawback is increased time and expense at inception and throughout the lifetime of each custom application. This has led to slow adoption of many advanced data management technologies by business enterprises and the like.

One advanced data management technology that is coming to the fore is semantic data management. These are technologies that utilize knowledge space-specific vocabularies to improve data retrieval, if not also data storage. In addition to the hurdles discussed above, however, current semantic data packages typically do not provide security features desired by many enterprises (e.g., financial institutions). The packages focus, instead, on improving data retrieval and, as a consequence, necessitate increased attention to security by application developers.

An object of the invention is to provide improved methods and apparatus for digital data processing.

A further object of the invention is to provide such methods and apparatus as facilitate digital data information storage and retrieval. A related object of the invention is to provide such methods and apparatus as facilitate data creation, retrieval, update and deletion ("CRUD") operations.

A further related object is to provide such methods and apparatus as facilitate the development and life-time maintenance of data management applications.

A still further object of the invention is to provide such methods and apparatus as ensure data security.

A yet still further object of the invention is to provide such methods and apparatus as are adapted for use with semantic data systems, as well as other advanced data technologies.

SUMMARY OF THE INVENTION

The foregoing objects are among those attained by the invention which provides, in one aspect, a digital data processing system for information storage and retrieval that includes a first digital data processor (e.g., personal computer, workstation, server, mainframe, etc.) coupled to a second digital data processor and a data store (e.g., a RDF data store, relational database, etc.). The first digital data processor creates, reads, updates and/or deletes data from the data store (i.e., "CRUD" operations) based on a model generated by the first digital data processor. The model comprises an ontology and a set of constraints that are applied to data characterized by the ontology.

In related aspects, the invention provides a digital data processing system for information storage and retrieval as described above in which the first digital data processor displays a user interface (UI) for performing CRUD operations. In further related aspects, the invention provides such a digital data processing system in which the UI is based on the model and code generated therefrom, e.g., by the first digital data processor and/or the second digital data processor. In still further related aspects, the invention provides such a digital data processing system in which the UI includes a plurality of data fields, each data field associated with one or more data labels (e.g., "SSN") and one or more data values (e.g., "0000000000").

In related aspects, the invention provides a digital data processing system for information storage and retrieval as described above in which the set of constraints include, for example, security rules (e.g., denying or allowing selected CRUD operations), validators (e.g., defining a minimum and/or maximum length for a data value, defining permissible data value character types), default values (e.g., "0," NULL, etc.), field masking (e.g., only transmitting the last 4 digits of a social security number for display in the UI).

In related aspects, the invention provides a digital data processing system for information storage and retrieval as described above in which the data labels are defined by the ontology and the data values are defined by any of the model (e.g., according to a default value constraint), and the first digital data processor (e.g., in response to a CRUD operation performed via the UI).

In related aspects, the invention provides a digital data processing system for information storage and retrieval as described above in which the second digital data processor masks a selected portion of one or more data values prior to generation and display of the UI on the first digital data processor, wherein said masking is based on one or more constraints defined in the model. In further related aspects, the invention provides a digital data processing system for information storage and retrieval as described above in which the first digital data processor generates a UI that displays portions of the data values that are not masked, and does not display the masked portions of said data values.

In related aspects, the invention provides a digital data processing system for information storage and retrieval as described above in which the first and/or second digital data processors generate a warning in response to user-input entered via the first digital data processor. In further related aspects, the invention provides a digital data processing system as described above in which the warning is generated in accord with the one or more constraints defined by the model (e.g., minimum or maximum data value length). In still further related aspects, the invention provides a digital data processing system as described above in which the first digital data processor displays said warning to a user and/or administrator.

In related aspects, the invention provides a digital data processing system for information storage and retrieval as described above in which the second digital data processor displays a UI for defining the constraints of the model. For example, the UI may include a serious of menus, check boxes, fields, etc., for creating, customizing, and associating security rules, default values, validators, and field masking constraints with data characterized in the ontology.

Still other aspects of the invention provide methods paralleling the operations described above.

These and other aspects of the invention are evident in the drawings and text that follows.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

Figure 1:
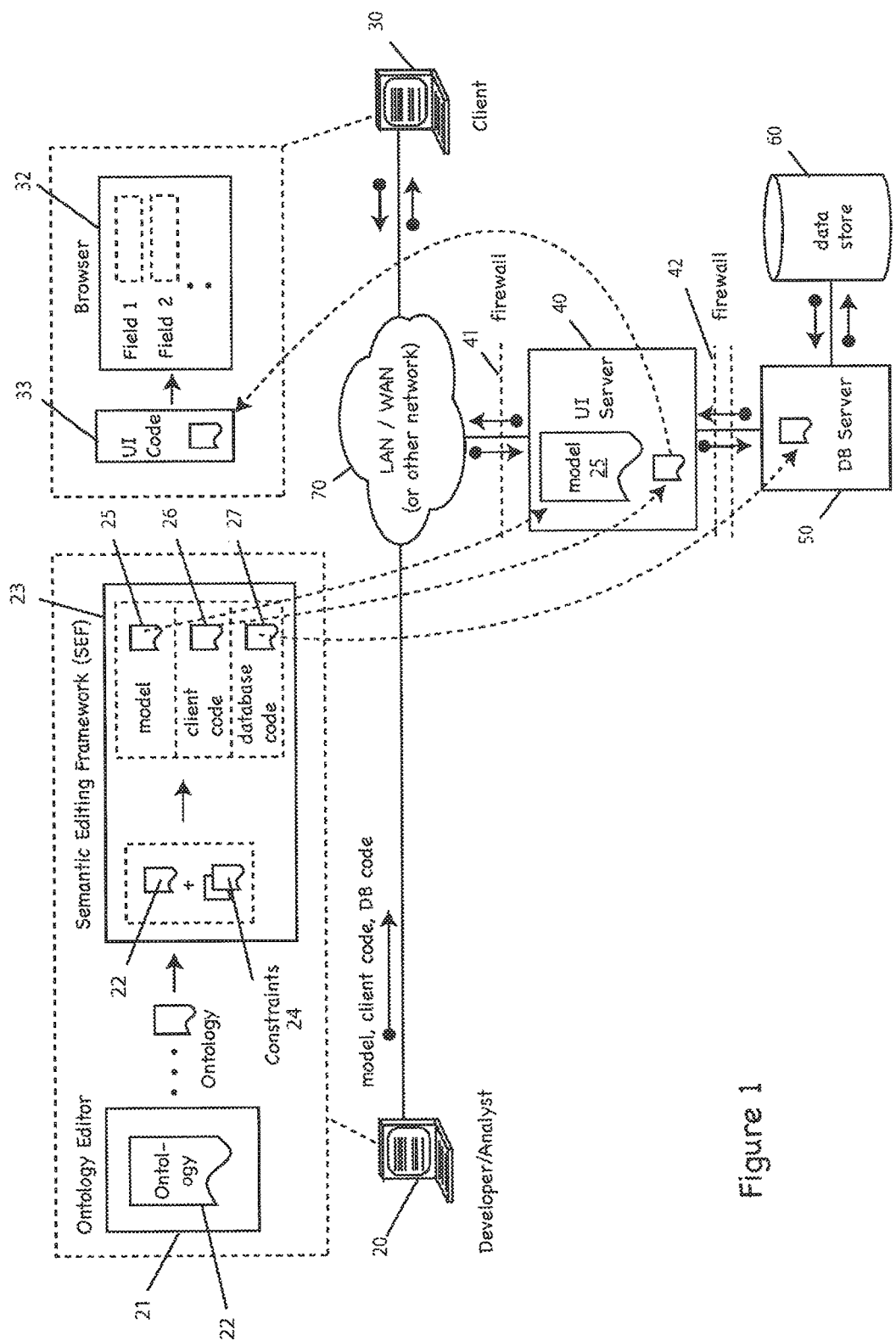
FIG. 1 depicts a digital data processing system and environment of the type used in practice of the invention.

FIG. 1 depicts a digital data processing system and environment for storing and retrieving digital data (e.g., RDF or other semantic data) according to one practice of the invention. This can include, for example, creating, reading, updating and deleting (CRUD) data from a data store via a Graphical User Interface (GUI), or other User Interface (UI), e.g., command-line, etc. In the illustrated embodiment, the system includes digital data processors 20-50, which may be personal computers, workstations, mainframes, or other digital data processing apparatus of the type known in the art capable of executing applications, programs and/or processes. Although digital data processors 20-50 are shown here, those skilled in the art will appreciate that in other embodiments the system may include a greater or lesser number of such digital data processors.

Illustrated digital data processors 20-50 execute in a network environment. In other embodiments, digital data processors 20-50 may operate alone or in other environments, networked or otherwise. In any event, illustrated digital data processors 20-50 are coupled to each other, as shown, via a network 70, such as the Internet, a local-area network (LAN), wide-area network (WAN), or otherwise, that may be public, private, IP-based, etc.

In a typical embodiment, illustrated here, digital data processor 20 comprises a personal computer, workstation, mainframe, or other digital data processing apparatus, as discussed above, and is used by a developer or analyst (collectively, "analyst), to build, test, and deploy a software platform providing CRUD editing capabilities to a client 30, as discussed further below. The digital data processor 20 executes a variety of applications for creating such a platform, including, for example, an ontology editor 21 and a semantic editing framework (SEF) 23. The illustrated ontology editor 21 creates an ontology 22 (e.g., either automatically or via analyst input) that defines a structure of data (e.g., RDF data stored in data store 60, discussed below). This may include a text editor, an interpreter/compiler, libraries, or otherwise—all of the type known in the art, albeit as adapted in accord with the teachings hereof. In the illustrated embodiment, the editor 21 creates the ontology 22 with the Web Ontology Language (OWL), although in other embodiments the editor 21 may use other ontology-definition languages, as well.

The illustrated SEF 23 defines (e.g., via analyst input) user roles (e.g., Supervisor, Analyst, Administrator, etc.), security rules, validators, default values, field masking, and/or other constraints 24 (collectively, "constraints") that are applied to data characterized by the ontology 22. In the illustrated embodiment, the constraints 24 are defined in XML, although in other embodiments it may be otherwise. The SEF 23 generates a semantic model 25 (or simply, "model") by combining the ontology 22 and constraints 23 into a cohesive file (or set of files). Accordingly, in the illustrated embodiment, the model 25 is the "foundation" for providing CRUD capabilities to the client 30, as discussed further below. The SEF 23 also generates client code 26 (e.g., Adobe Flex) for creating the client interface 31, and the database code 27 which facilitates interaction between the digital data processor 50 (discussed below) and the data store 60 (discussed below).

Illustrated digital data processor 30 comprises a personal computer, workstation, mainframe, or other digital data processing apparatus, as discussed above, and is used by a client to interface with stored data (e.g., RDF or otherwise). In the illustrated embodiment, the client 30 provides an interface 32 (e.g., graphical or otherwise) for interacting with data in the data store 60. By way of non-limiting example, the client 30 provides operations for creating, reading, updating and/or deleting data (CRUD) in the data store 60, although the client 30 may provide other operations, as well. In the illustrated embodiment, the interface 32 is generated from UI code 33 comprising the client code 26, HTML, and other web technologies known in the art, such as JavaScript, etc, although in other embodiments it may be otherwise.

The digital data processor 40 (or "UI server") comprises a personal computer, workstations, mainframe, server, or other digital data processing apparatus. In the illustrated embodiment, the digital data processor 40 generates the UI code 33 that displays the UI 32 on the client device 30. In the illustrated embodiment, the data processor 40 generates the code 33 from the model 25 and the client code 26, and comprises a combination of Adobe Flex code, and HTML, JavaScript, XML, etc., although it may also include other components instead of, or in addition to the aforementioned technologies (e.g., programming libraries, modules, etc.) Although in the illustrated embodiment, the data processor 40 generates the UI code 33, in other embodiments the data processor 20 may generate such code 33 itself, e.g., via the SEF 23, and the data processor 40 may only store and execute that code 33 without the model 25.

As discussed above, the digital data processor 40 executes in a network environment, e.g., in communications coupling with digital data processors 20-30 and 50 via the LAN/WAN 70. In the illustrated embodiment, the digital data processor 40 executes behind one or more firewalls 41 and 42 of the type conventionally known in the art of digital network security. The firewalls 41 and 42 themselves may comprise software executing on the digital data processor 40, or they may execute on dedicated appliances (e.g., one or more digital data processors). In any event, the firewalls 41 and 42 regulate traffic between and among the digital data processors 20-50, e.g., in order to prevent unauthorized access to the digital data processor 40. Thus, for example, the firewalls 41 and 42 may be configured by the analyst to permit, deny, encrypt, decrypt, or proxy network traffic between different security domains based upon a set of rules and/or other constraints (e.g., as defined in the model 25, or otherwise). Although firewalls are shown here, those skilled in the art will appreciate that systems according to the invention may employ a wide range of security measures of the type commonly known in the art of information security (e.g., physical security, authentication systems, anti-virus software, etc.), albeit as adapted in accord with the teachings hereof.

The illustrated digital data processor 50 (or "Database Server") comprises a personal computer, workstation, mainframe, server, or other digital data processing apparatus, that executes a digital data information storage and retrieval application (e.g., a database management system). The data processor 40 stores, retrieves, updates, deletes, and otherwise interfaces with data maintained on networked attached storage device 60. In the illustrated embodiment, the data store 60 comprises a hard disk drive and/or other persistent storage device of the type known in the art. By way of non-limiting example, the storage device (or "data store") 60 stores data (e.g., RDF or otherwise) for retrieval and display by the digital data processors 30 and 40.

FIG. 2A-2E depict an exemplary user interface display 100 for the SEF 23 that allows a user (e.g., analyst, developer, administrator, etc.) to create, customize and associate the constraints 24 with the data characterized in the ontology 22. In the illustrated embodiment, the SEF 23 will generate the model 25, and the code associated therewith (e.g., client code 26, database code 27, etc.), from the ontology 22 and constraints 24. In other embodiments, a user may bypass the SEF display 100 altogether and manually code the constraints 24 to add or customize constraints as necessary. FIG. 2A-2E further depict exemplary code "snippets" 22a and 24a from the ontology 22 and constraints 24 which reflect a current display state of the UI 100. More particularly, as constraints are added, as illustrated in FIGS. 2A-2E, the constraints file 24a is updated to contain the SEF-generated code for those constraints. Associated FIGS. 3A-3E depict exemplary client user interface displays 32 corresponding to the SEF interface displays 100 of FIGS. 2A-2E. More specifically, FIG. 3A corresponds to FIG. 2A, FIG. 3B corresponds to FIG. 2B, and so on and so forth.

By way of overview, the ontology 22 is defined with OWL, as mentioned above, a portion of which is shown here (22a). OWL uses an RDF/XML syntax to define a set of "classes" (e.g., "Person") that each have assigned "properties" (e.g., "SSN"). However, those skilled in the art will appreciate that classes and properties are specific to an OWL implementation of the ontology 22, and in other embodiments, the ontology 22 may be implemented otherwise.

Also as discussed above, and again by way of overview, the constraints 24 are defined in XML, a portion of which is shown here (24a), although in other embodiments, the constraints may be defined otherwise. Those skilled in the art will appreciate that the ontology 22a, constraints 24a, and display 100 illustrated here are shown only by way of example, and other embodiments may be implemented otherwise (e.g., without properties or classes), or without ontologies at all (e.g., the system may use another semantic definition structure).

Figure 2A:
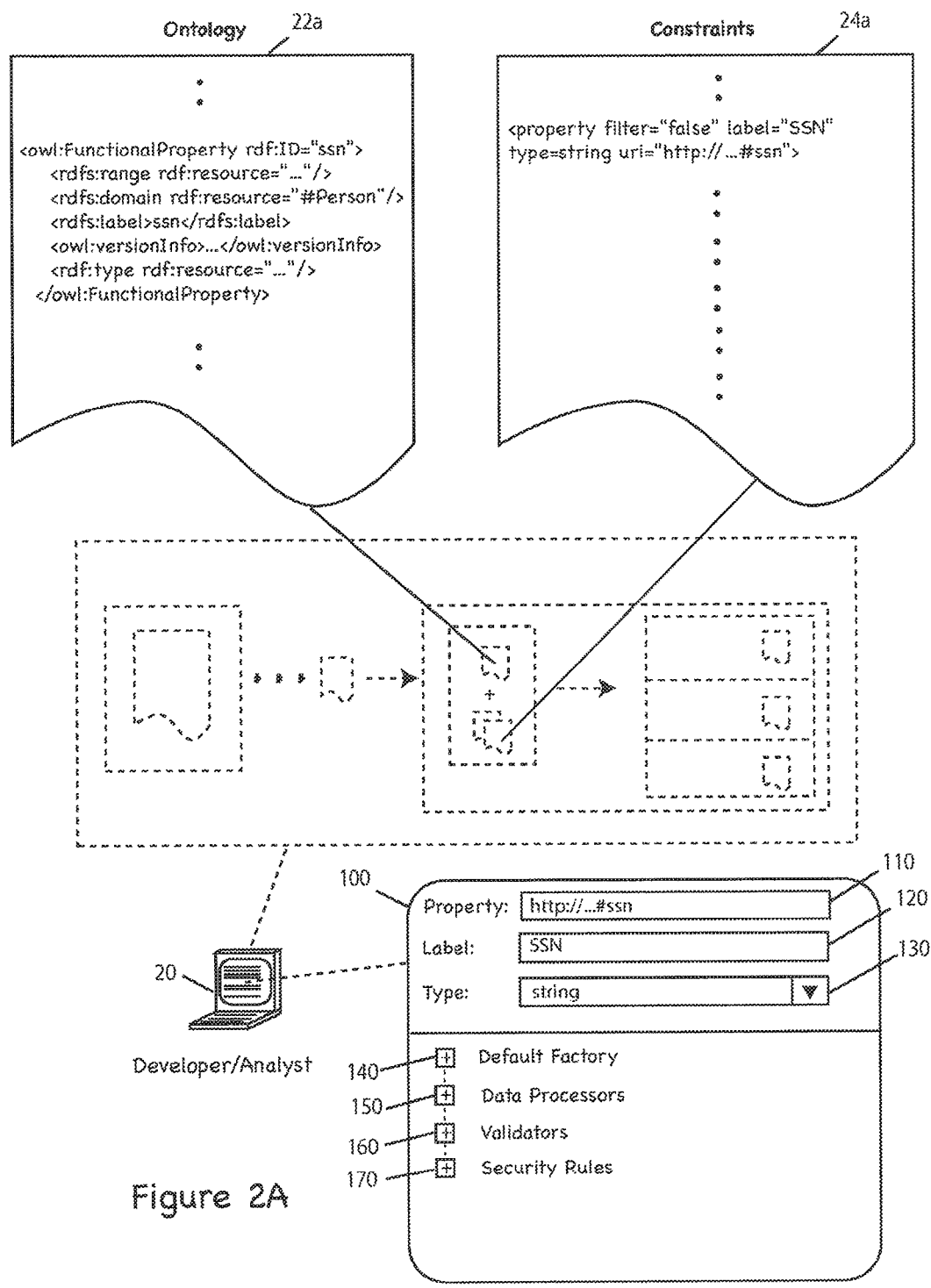
FIGS. 2A-2E depict developer-side user interface (UI) displays, e.g., for defining a digital data storage and retrieval system that provides CRUD capabilities.

FIG. 2A, more particularly, depicts an exemplary SEF 23 user interface 100 displayed on the digital data processor 20 used for customizing and generating the model 25. In the illustrated embodiment, shown here, an analyst may add, remove, update, or otherwise define constraints via a set of graphical menus 110-170, and the SEF 23 generates code 24a corresponding to those constraints. As discussed above, and below, those constraints can include, for example, default values 140, field masking 150, validators 160, and security rules 170, just to name a few. Those skilled in the art will appreciate that menus 110-170, as well as the code 22a and 24a, are shown merely by way of example, and in practice of the invention, the system may include many different configuration options (e.g., pre-defined in the system package, defined by a developer during the initial system deployment, and/or by a client after the system has been deployed).

Although not illustrated here, the SEF 23 may also define user roles (e.g., Supervisor, Analyst, etc.), and assign each role a selected "privilege" level. By way of non-limiting example, a Supervisor may have a higher privilege level than an Analyst. In the illustrated embodiment, user roles are often associated with constraints (e.g., security rules, field masking, etc.), as discussed further below. Thus, by way of non-limiting example, the SEF 23 may define a constraint that allows a Supervisor, but not an Analyst, to perform update operations.

As shown here, by way of example, the display 100 is divided into two regions (i.e., a top region and a bottom region). The top region includes a property field 110, label field 120, and type field 130. Those skilled in the art will appreciate that the illustrated display 100 is shown merely by way of example, and other embodiments may use a different display (e.g., an undivided display, a display with three or more regions, etc.), or no display at all (e.g., an analyst may edit the model directly by hand-coding the constraints 22).

In the illustrated embodiment, the property field 110 displays the namespace and name of the selected property (e.g., "http:// . . . /#ssn," as shown by way of non-limiting example) defined in the constraints 22a (e.g., via an analyst using the SEF UI 100). The label field 120 comprises a configurable field used to set the field name (e.g., "SSN," as shown by way of non-limiting example) that will display on the client interface 32. The type field 130 is a configurable field (e.g., via a "drop down" selection box, as shown) that sets the data type of the field, e.g., "string" (as shown by way of non-limiting example), boolean, data, or float, just to name a few. In the illustrated embodiment the type field 130 is typically populated from the ontology 22, but it may also be manually set, e.g., by the analyst. Those skilled in the art will appreciate that fields 100-130 are shown by way of example, and in practice may include other fields, selection boxes, checkboxes and otherwise, e.g., as specified by the ontology 22, constraints 24, or otherwise.

Figure 2B:
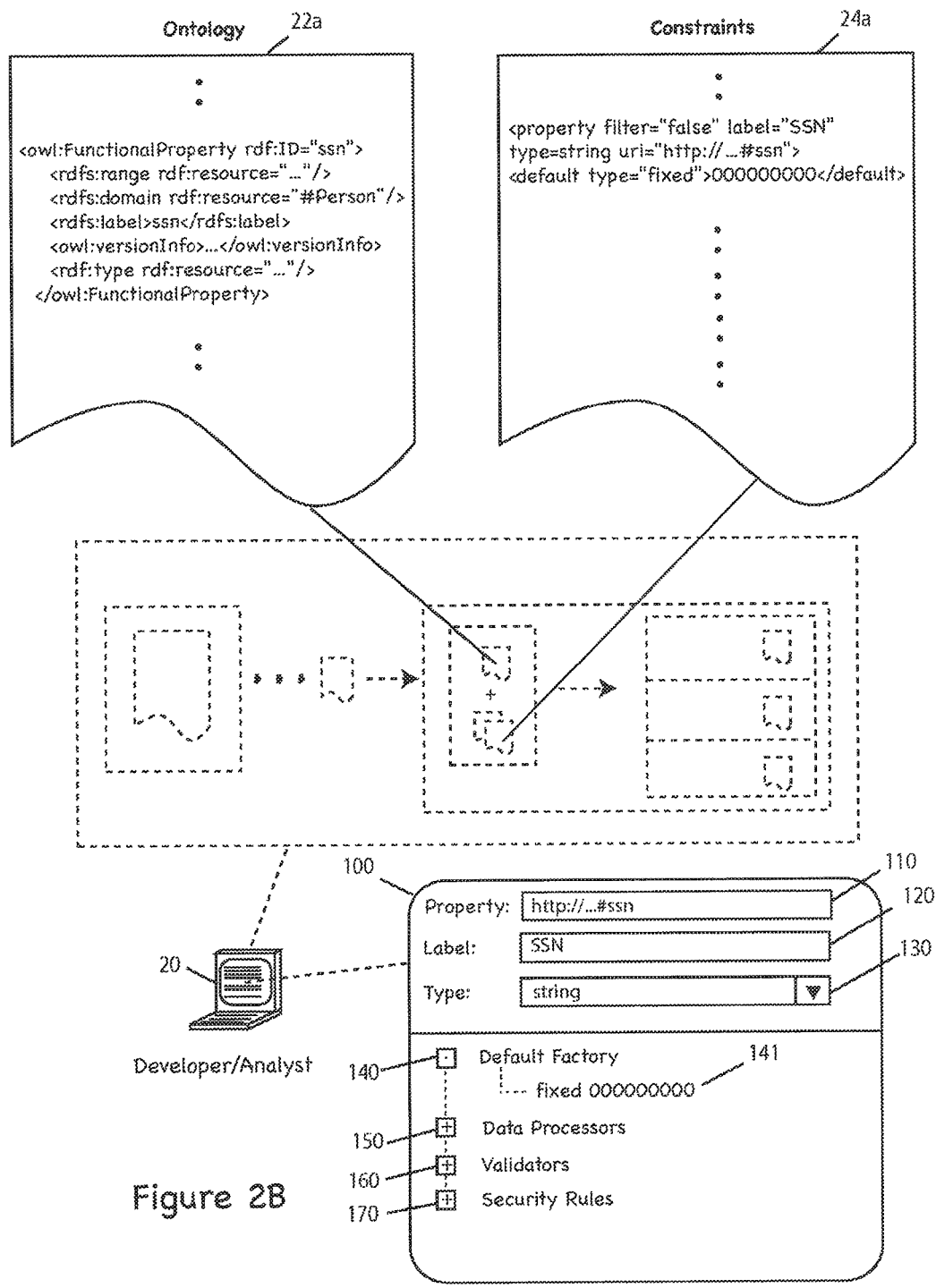

The bottom region of display 100 provides configuration menus for defining the constraints 24. The display 100 includes a default factory menu 140, data processor menu 150, validator menu 160, and security rules menu 170, although in practice of the invention, a greater or lesser number of menus may be displayed. As shown in FIG. 2B, by way of non-limiting example, the user has chosen to constrain the property "http:// . . . #ssn" having the label "SSN" as having a "string" value. Also as shown, the SEF 23 has generated the corresponding code 24 for that constraint. Again, the display 100 and constraint code 24a are shown by way of non-limiting example and may vary in practice (e.g., the generated code may be in a markup language other than XML, etc.).

FIG. 2B depicts the display 100, generally as described above, further including a default factory constraint 141 defined in the default factory menu 140. The default factory constraint 141 effectively sets a static default value for a selected property (e.g., "http:// . . . #ssn"). More specifically, the constraint 141 specifies that the selected property has a fixed default value, e.g., "000000000." The SEF 23 will subsequently generate the code 24a that will instruct the client 30 to display a default value of "000000000" for this property in the corresponding field 32a of the UI 32. See FIG. 3B. Those skilled in the art will appreciate that in practice of the invention, other default values may be defined instead of, or in addition to, the illustrated default value, shown by way of non-limiting example.

Figure 2C:
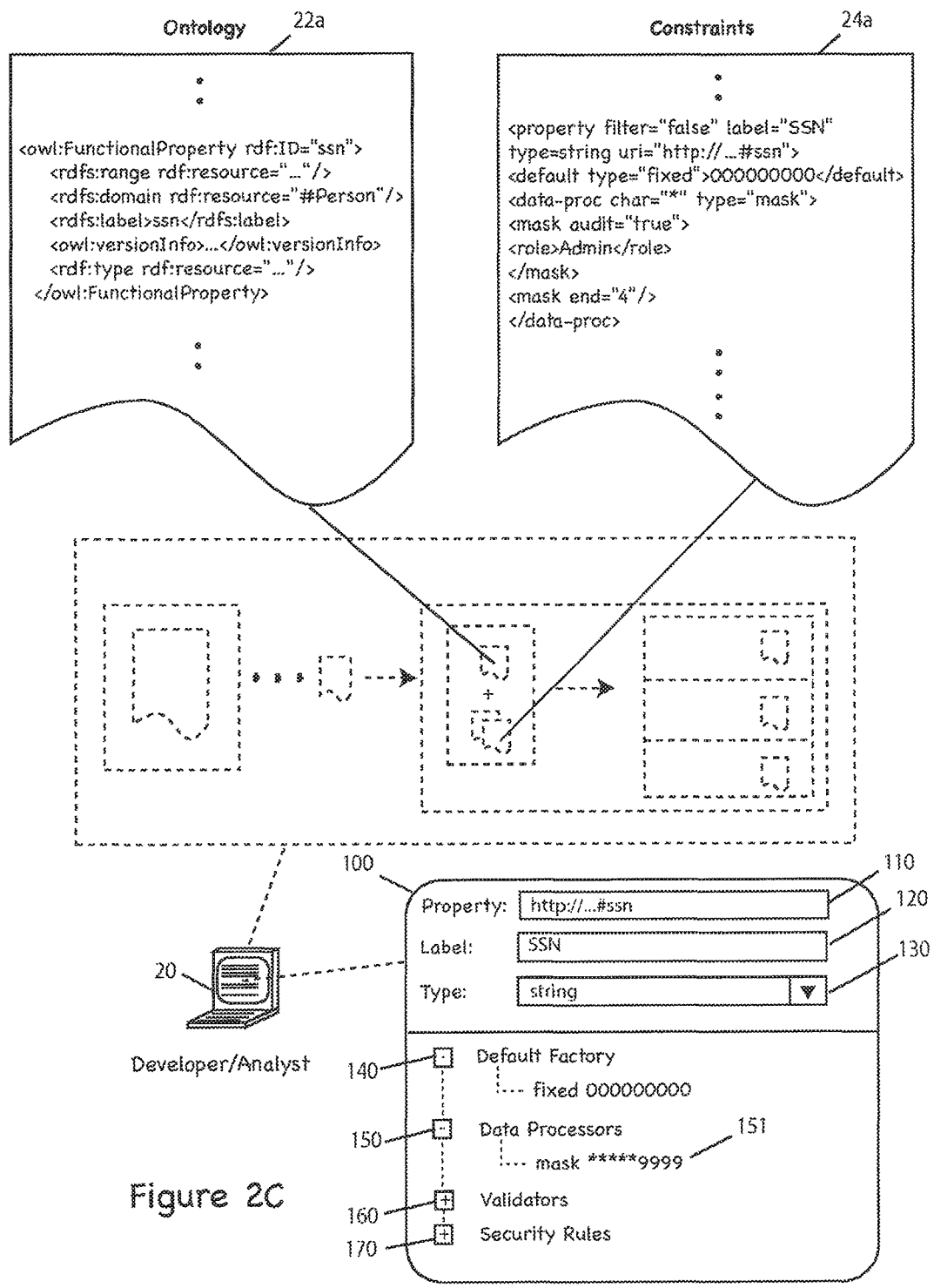

FIG. 2C depicts the display 100, generally as described above, further including a data processor 151 defined in the data processor menu 150. The specified data processor 151 applies a character masking constraint to the selected property (e.g., "http:// . . . #ssn"). In the illustrated embodiment, selecting "mask" instructs the SEF 23 to generate code that, when executed by the digital data processor 40 (or other apparatus that generates the UI 32), will hide the property's value in the UI 32 and enter a mask character that will display in the UI (e.g., an asterisk). See FIG. 3C. Properties can be assigned a number of different masking settings that will be applied based upon the role assigned to the user viewing the field. By way of non-limiting example, a data processor could be defined to allow a "supervisor" to see more of data (e.g., a social security number) than an "analyst," or to mask additional characters when performing an specific operations.

Generally, masking is performed by entering into the UI 100 the number of characters that should be masked at the start and end of the selected field, and by selecting the role(s) that the mask should apply to. In the illustrated embodiment, a blank start and/or end values are assumed as zeroes, and a blank role entry will apply the mask to all roles, although in other embodiments it may be otherwise. Moreover, if a user's role matches multiple entries in the list of masks for a selected property, then the first mask in the list will be applied. In the illustrated embodiment, masking is based on the role of the user, and that the system will always mask according to the most restrictive role added, although in other embodiments this may vary.

Those skilled in the art will appreciate that in practice of the invention, other data processors may be defined instead of, or in addition to, the illustrated masking data processor, shown by way of non-limiting example.

Figure 2D:
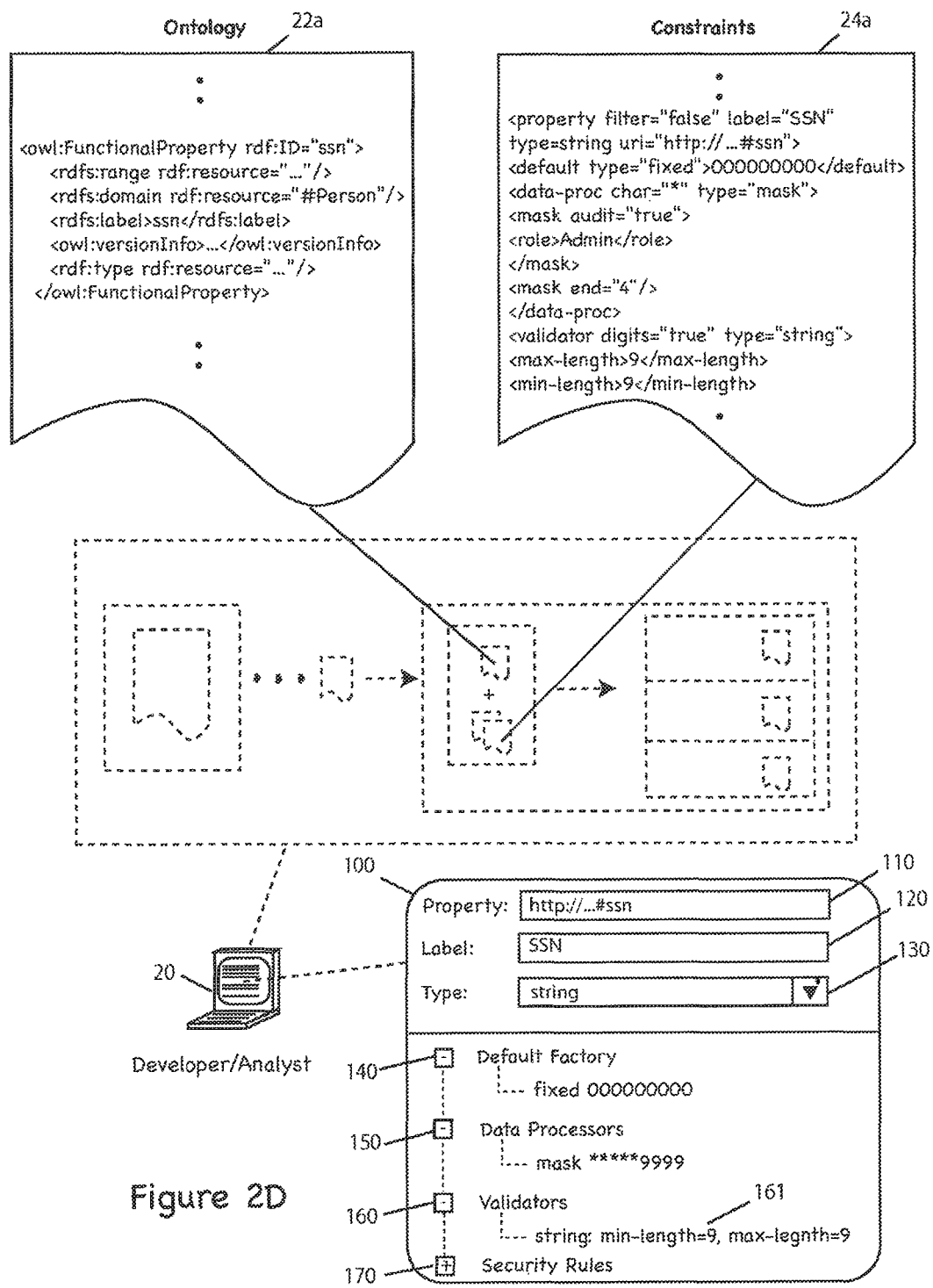

FIG. 2D depicts the display 100, generally as described above, further including a validator constraint 161 defined in the validator menu 160. In the illustrated embodiment, the constraint 161 allows a user to create an integer definition for validation that can be set with minimum or maximum values for a selected property. Thus, as shown by way of non-limiting example, the selected property (e.g., social security number) must have a minimum length of nine characters and maximum length of nine characters, i.e., effectively requiring a nine-digit entry. By way of further example, the SEF 23 will generate code 24a that, when executed by the digital data processor 40, will instruct the client 30 to display a UI 32 that requires a nine-digit entry in the selected property field 32a. See FIG. 3D. Those skilled in the art will appreciate that in practice of the invention, other validators may be defined instead of, or in addition to, the illustrated validator, shown by way of non-limiting example.

Figure 2E:
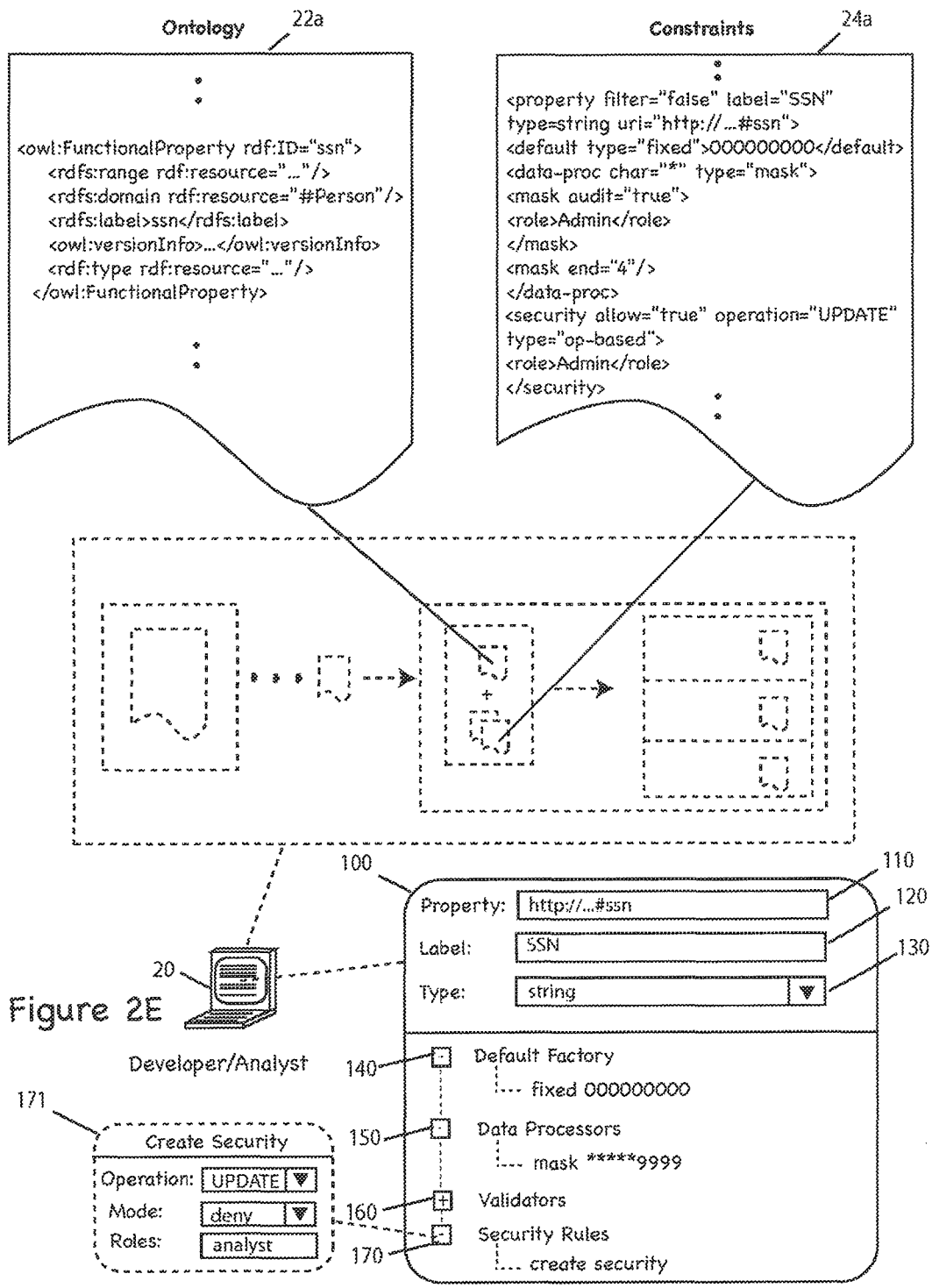
Figure 3A:
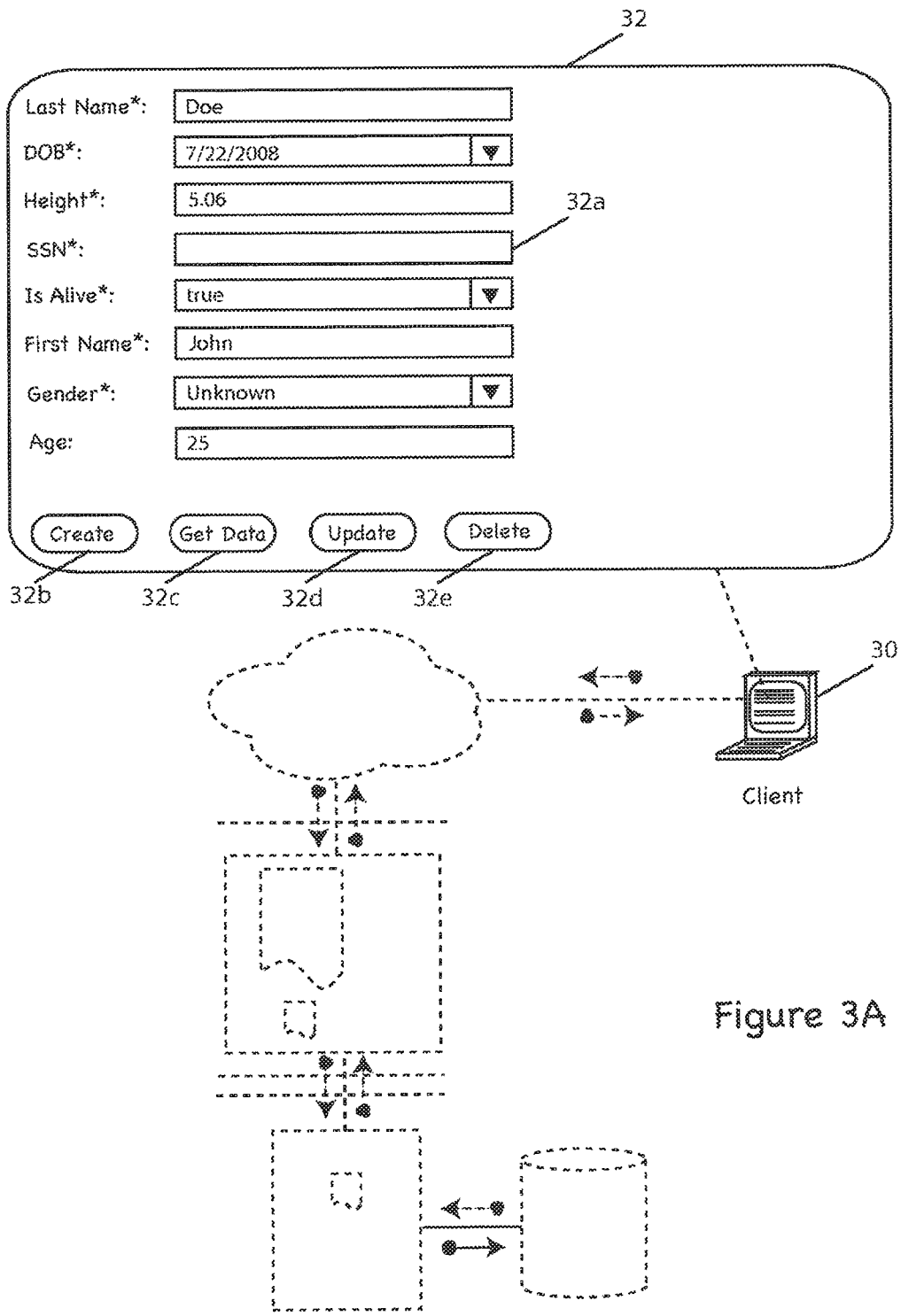
FIGS. 3A-3E depict client-side user interface (UI) displays, e.g., for performing CRUD or other digital data storage and retrieval operations.
Figure 3B:
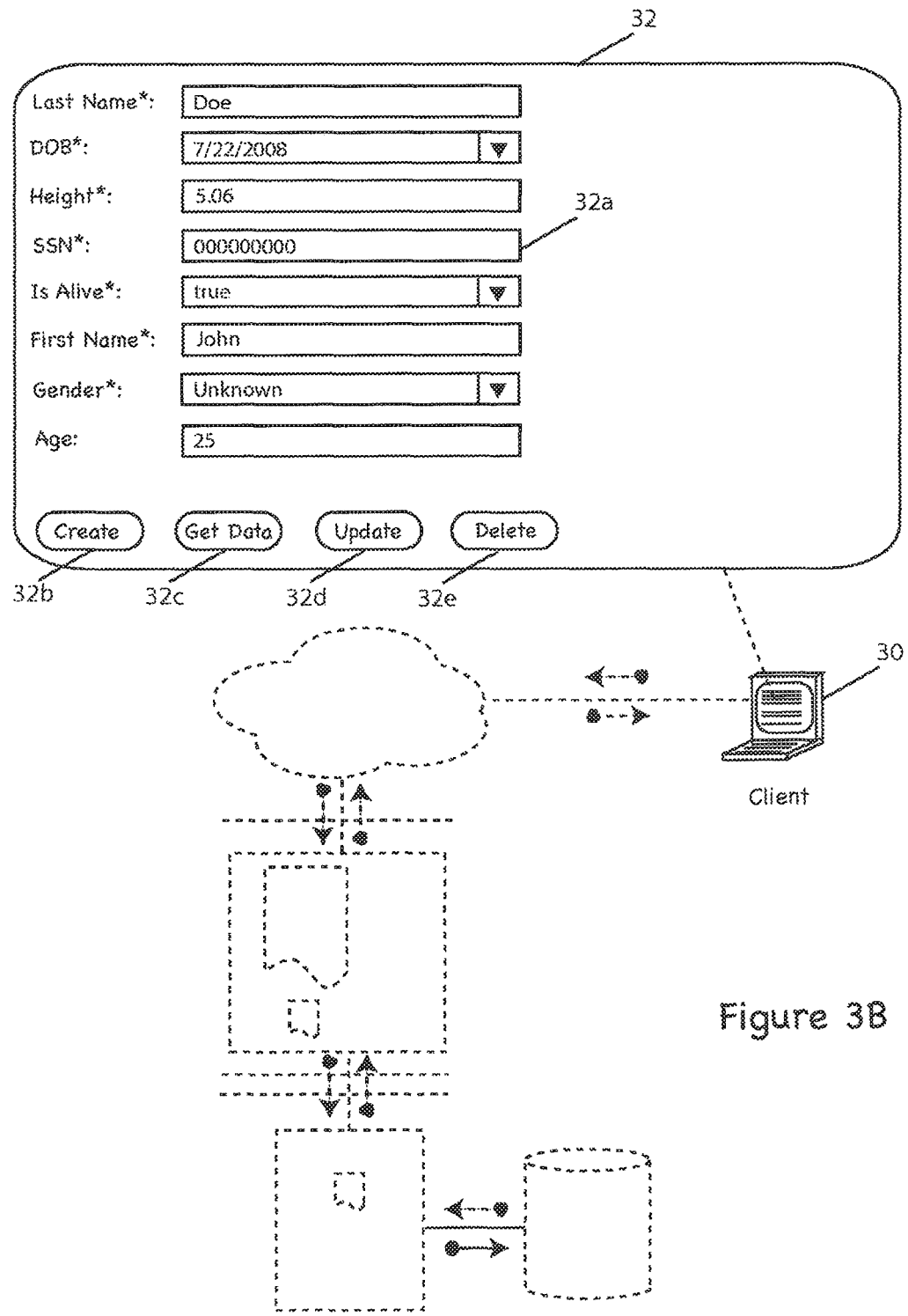
Figure 3C:
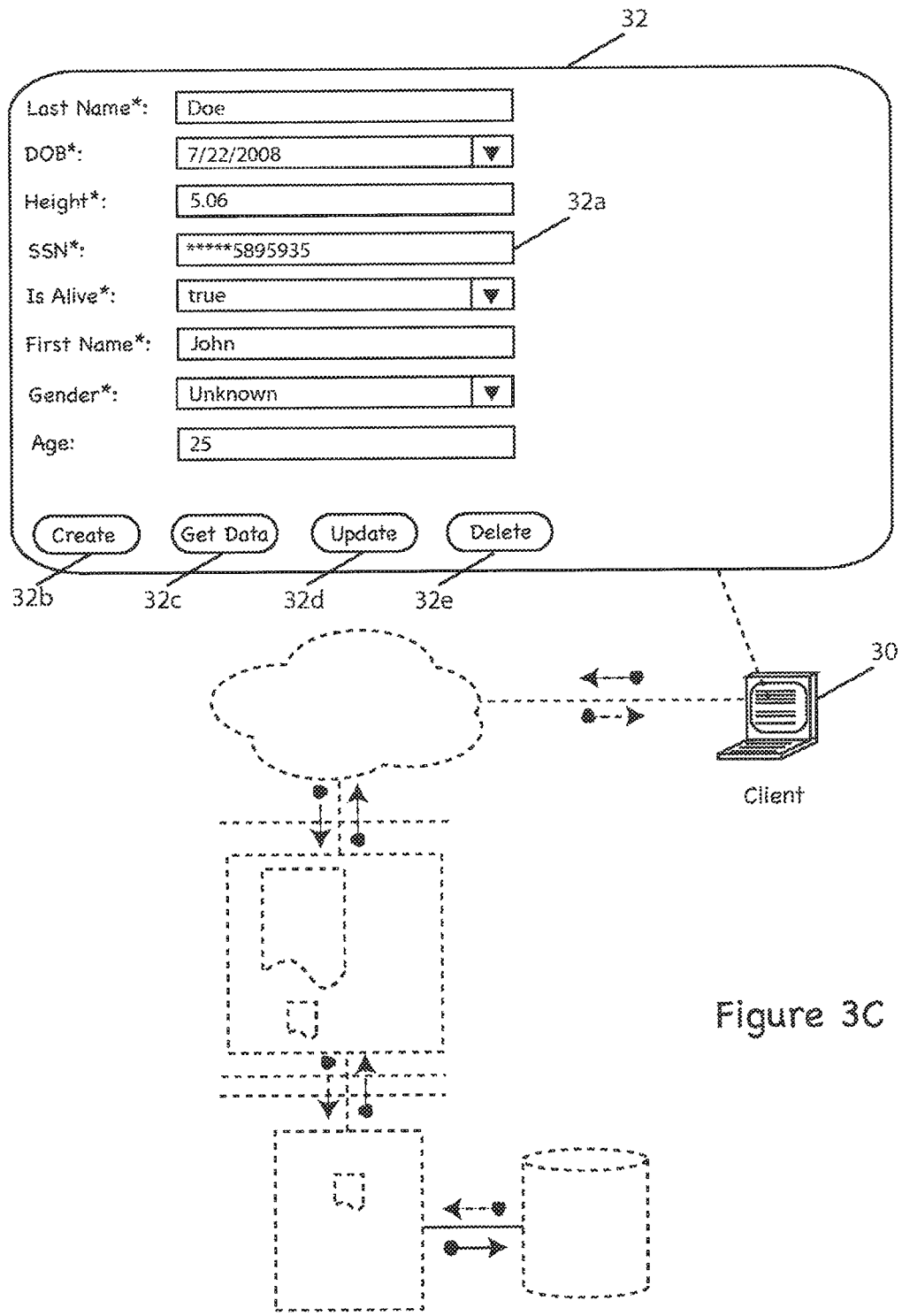
Figure 3D:
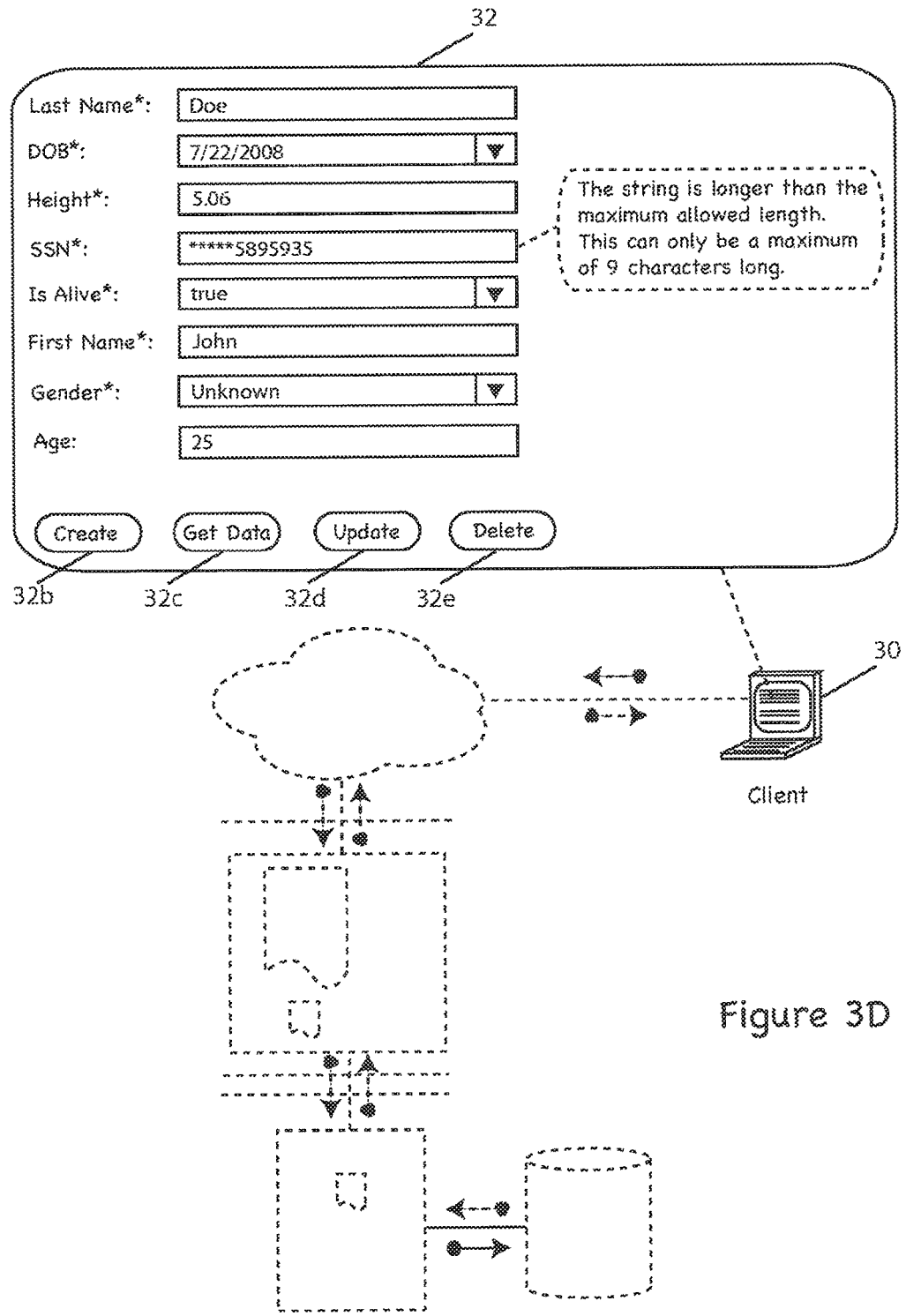
Figure 3E:
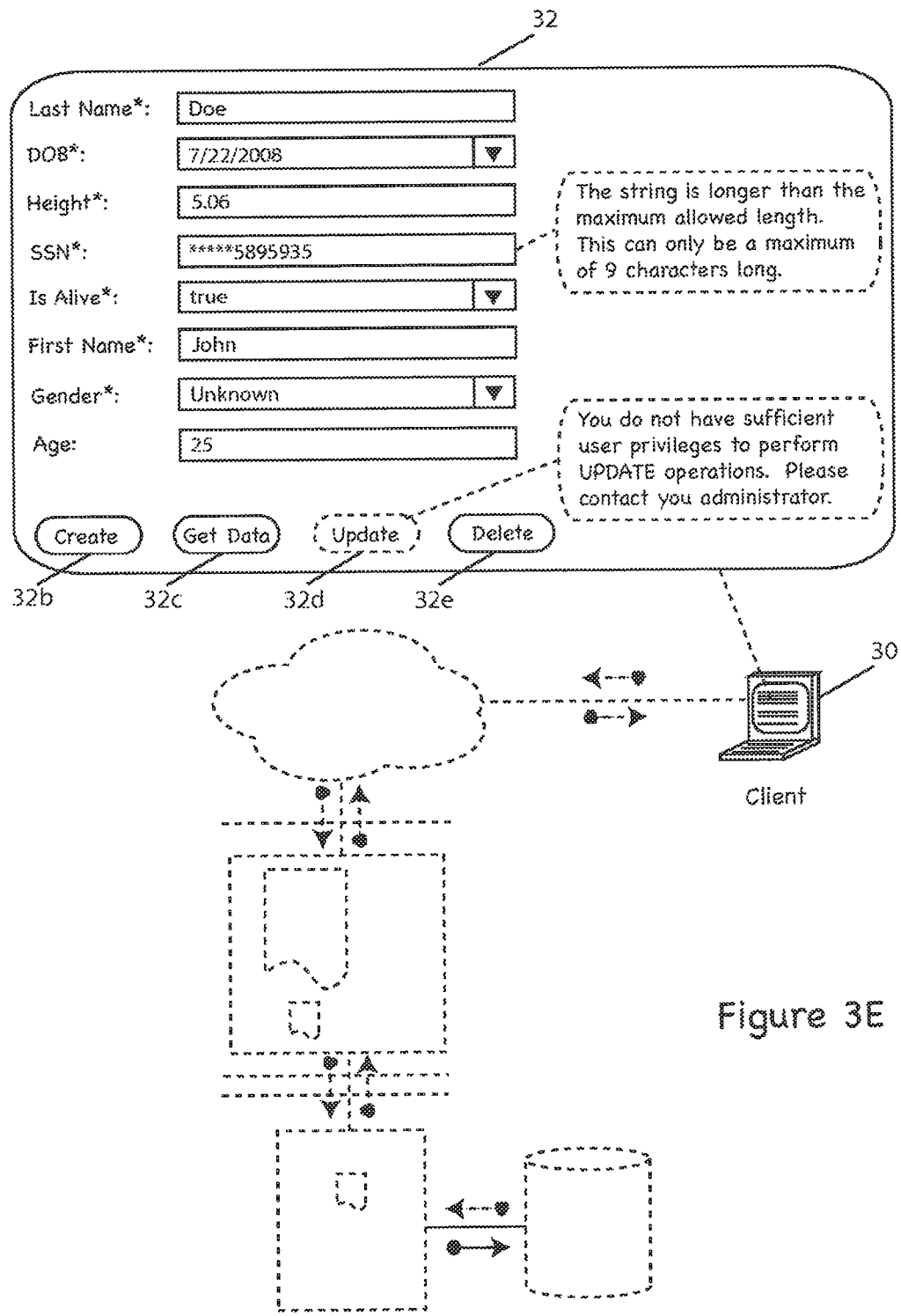

FIG. 2E depicts the display 100, generally as described above, further including a security rule constraint defined in the security rules menu 170. In the illustrated embodiment, a security rule can be set by user role and/or by operation (e.g., create, read, update, delete, etc.). As shown, by way of non-limiting example, a user can define a constraint (e.g., via pop-window 171 or otherwise) that specifies that Analysts are not allowed to perform update operations. By way of further example, the SEF 23 will generate code 24a that, when executed by the digital data processor 40, will instruct the client 30 to display a UI 32 that will not allow Analysts to perform update operations. See FIG. 3E. Those skilled in the art will appreciate that in practice of the invention, other security rules may be defined instead of, or in addition to, the illustrated security rule, shown by way of non-limiting example.

FIGS. 3A-3E, referenced above, depict a user interface (UI) 32 executing on client digital data processing device 30 (e.g., personal computer, workstation, etc.). In the illustrated embodiment, the client device 30 provides a user interface 32 for interacting with stored digital data (e.g., data create, read, update and delete operations, and so forth). As shown, the user interface 32 includes a variety of fields, e.g., "SSN" field 32a, discussed above, and several "buttons" 32b-32e for performing "CRUD" operations (e.g., via HTTP methods, RPC, or otherwise). Although user interface buttons are only included for data create 32b, read 32c, update 23d and delete 32e operations, those skilled in the art will appreciate that in practice of the invention the UI 32 may include other interface options instead of, or in addition to, the interface buttons shown here by way of non-limiting example.

Figure 4:
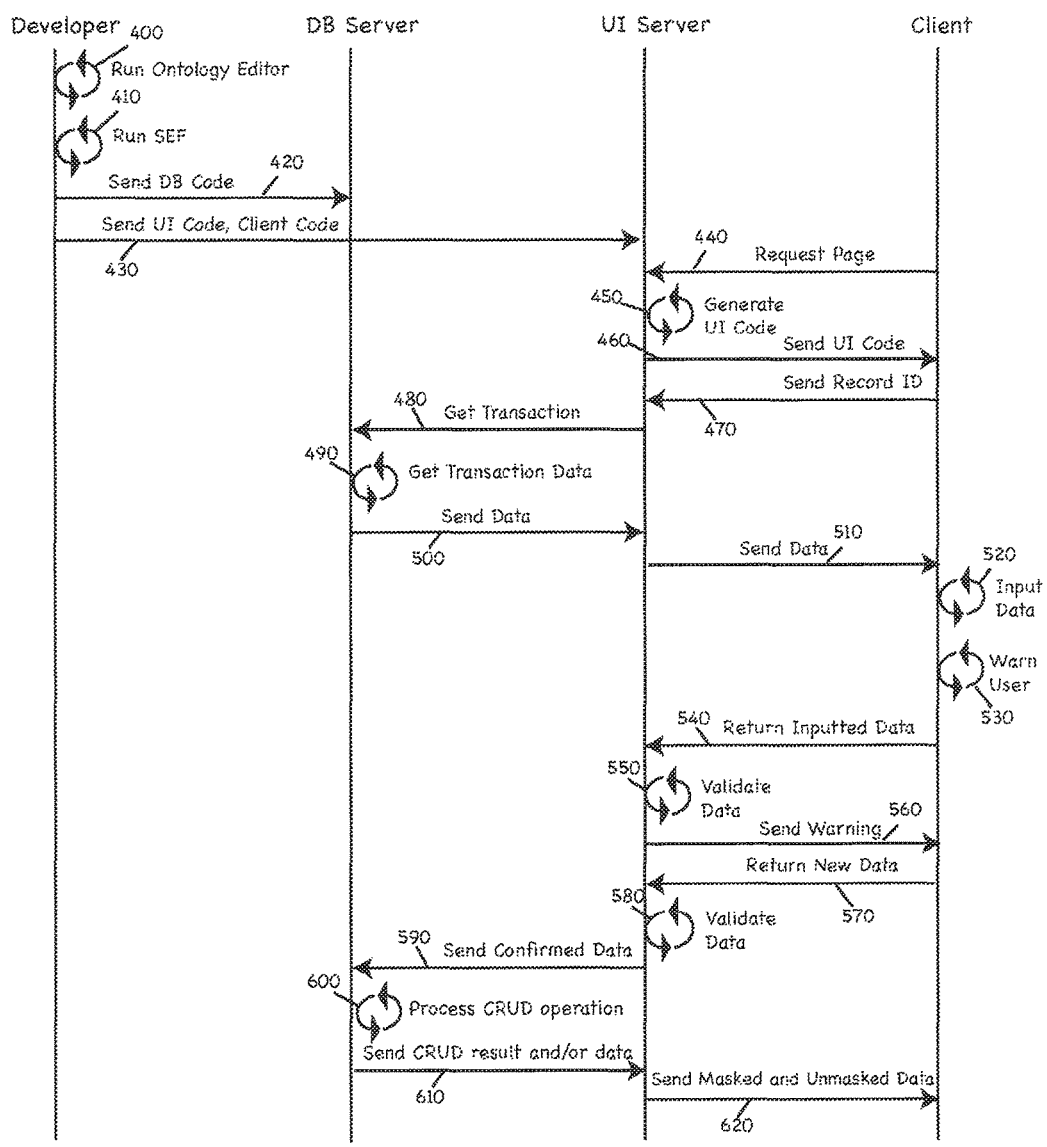
FIG. 4 depicts an operation of a system for storing and retrieving digital data (e.g., RDF data or otherwise) according to one practice of the invention.

FIG. 4 depicts an exemplary operation of a system for storing and retrieving digital data (e.g., RDF or other semantic data) according to one practice of the invention. The illustrated sequence of steps is just one of many with which the invention may be practiced. Thus, it may be practiced with a greater or lesser number of steps than those shown here, ordered as shown in the drawing or otherwise.

By way of overview, as discussed above, a system executing in accord herewith stores and retrieves digital data (e.g., RDF or other semantic data) in accord with a model 25, or, more particularly, in accord with an ontology 21 (e.g., defined via the ontology editor 21) and a set of constraints 24 (e.g., defined via the SEF 23). This storing and retrieving of digital data can include, for example, creating, reading, updating and deleting (CRUD) data from a data store 60 via a Graphical User Interface (GUI) 32, or other User Interface (UI), e.g., command-line, etc.

Unlike other data storage and retrieval systems currently available in the prior art (e.g., in which developers APIs supplied with the systems to write "one-off" applications), the system of the illustrated embodiment allows a user 20 (e.g., developer, analyst, etc.) to create a model 25 that defines how user's (e.g., client 30) interact with data (e.g., RDF data in data store 60). Thus, for example, as client requirements change (e.g., increased security on UPDATE operations), the user may easily edit the model 25, rather than having the original developers either extensively modify the existing application, or write an entirely new application from scratch.

FIG. 4 depicts a sequence of steps for performing storage and retrieval operations (e.g., CRUD operations, etc.) in a system according to the invention. In steps 400-430, a developer, administrator, analyst, etc. (collectively, "analyst") builds and deploys a software platform providing CRUD editing capabilities to a client, as discussed above. More particularly, in the illustrated embodiment, an analyst executes the ontology editor 21 (e.g., on the digital data processor 20 or otherwise). See step 400. The illustrated ontology editor 21 creates an ontology 22 that defines a structure of data (e.g., RDF data stored in data store 60, discussed below). This may include a text editor, an interpreter/compiler, libraries, or otherwise—all of the type known in the art, albeit as adapted in accord with the teachings hereof. In the illustrated embodiment, the editor 21 creates the ontology 22 with the Web Ontology Language (OWL), although in other embodiments the editor 21 may use other ontology-definition languages, as well.

In step 410, the analyst executes the SEF 23 (e.g., on the digital data processor 20, or otherwise) to define user roles (e.g., Supervisor, Analyst, Administrator, etc.), security rules, validators, default values, field masking, and/or other constraints 24 (collectively, "constraints") that are applied to data characterized by the ontology 22. In the illustrated embodiment, the constraints 24 are defined in XML, although in other embodiments it may be otherwise. The SEF 23 generates a semantic model 25 (or simply, "model") by combining the ontology 22 and constraints 23 into a cohesive file (or set of files). Accordingly, in the illustrated embodiment, the model 25 is the "foundation" for providing CRUD capabilities to the client 30.

In step 420, the SEF 23 generates and transmits database code 27 to the database server 50. In the illustrated embodiment, the code 27 facilitates interaction between the database server 50 and the data store 60. In step 430, the SEF 23 generates and transmits the client code 26 (e.g., Adobe Flex) to the UI Server 40 for creating the client interface 31 displayed on the client device 30 (e.g., via a web browser), although in other embodiments, the code 26 may be transmitted directly to client device 30.

In the illustrated embodiment, as discussed above, the SEF 23 displays a user interface 100 for the analyst to customize and generate the model 25. More particularly, the analyst may add, remove, update, or otherwise define the constraints 24 via a set of graphical menus 110-170, and the SEF 23 generates code 24*a* corresponding to those constraints. As discussed above, those constraints 24 can include, for example, default values 140, field masking 150, validators 160, and security rules 170, just to name a few.

In step 440, the client device 30 sends a request to the UI server 40 for an interface 32 (e.g., a web page) for interacting with data in the data store 60. By way of non-limiting example, the client 30 may request a web page that provides form-Tillable fields and graphical buttons for performing CRUD operations, although the client 30 may request other interfaces, as well (e.g., a log-in screen, etc.). In the illustrated embodiment, the interface 32 is generated from UI code 33 comprising the client code 26, HTML, and other web technologies known in the art, such as JavaScript, etc, although in other embodiments it may be otherwise.

In step 450, the UI server 40 generates the UI code 33 that will display the UI 32 requested in step 440. In the illustrated embodiment, the UI server 40 generates the code 33 from the model 25 and the client code 26, and comprises a combination of Adobe Flex code, HTML, JavaScript, XML, etc., although it may also include other components instead of, or in addition to, the aforementioned technologies (e.g., programming libraries, modules, etc.). Although in the illustrated embodiment, the UI server 40 generates the UI code 33, in other embodiments the data processor 20 may generate such code 33 itself, e.g., via the SEF 23, and the UI server 40 may only store and execute that code 33.

In step 460, the UI server 40 sends the UI code 33 to the client 30 (e.g., via LAN/WAN 70), and the client 30 renders the user interface 32 (e.g., a web-fillable form with blank data fields) from that code 33. Those skilled in the art will appreciate that one or more firewalls 41 are employed to insure that the UI code 33, or other data, is not intercepted (e.g., by hackers, sniffers, etc.). Moreover, to further insure system security and integrity, in the illustrated embodiment only necessary code and data is sent to the client, e.g., as defined by the model 25, discussed above. Although not shown here, in other embodiments, the system may employ additional firewalls or other security measures commonly known in the art of information security, albeit as adapted in accord with the teaching hereof.

In step 470, the client sends a data identifier (e.g., a record identifier) to the UI server 40 for processing by the UI server 40 and/or database server 50, as discussed below. By way of non-limiting example, the data identifier may be a "Customer ID" that has data attributes (e.g., last name, date of birth, height, social security number, etc.) associated with fields of the interface 32. In step 480, the UI server 40 sends a transaction request to the database server 50 to retrieve data associated with the identifier from the data store 60. In step 490, the database server 50 processes the request of step 480 and retrieves the data from the store 60 (e.g., via SQL, SPARQL, etc.). In steps 500-510, the retrieved data is sent to the UI server 40 and then to the client 30 for display in the UI 32. See, for example, FIG. 2A.

In step 520, the client 30 inputs data and initiates a selected CRUD operation (e.g., via the user interface 32). For the purposes of this discussion, we will assume that the interface 32 looks similar to that illustrated in FIGS. 2A-2E, and the user wishes to input a social security number data value into a social security number data fields (i.e., perform a data create operation). However, those skilled in the art will again appreciate that these steps are shown merely by way of non-limiting example, and may include other steps in addition to, or instead of, the steps discussed above (e.g., other CRUD operations may be performed, other data values may be input/edited, etc.).

In step 530, the client 30 performs a "client-side" validation on the data inputted in step 520. In the illustrated embodiment, client-side validations are executed by the UI code 33, and are defined in the client code 26, although in other embodiments they may be executed and/or defined otherwise (e.g., in the model 25). By way of non-limiting example, client-side validations can include, among others, the constraints discussed above (e.g., minimum string length, maximum string length, etc.), and if any validation fails, the user is warned, e.g., via a pop-up window displayed in the UI 32 or otherwise. Thus, for example, if the client code 26 required a validation that a social security number data value must have a minimum and maximum character length of nine characters, and the user failed to input a nine-character social security number data value, the user would be warned (see, e.g., FIG. 3D), and prompted to reenter the number. This process will be repeated until all validations are passed. Those skilled in the art will appreciate the above example is just that—an example, and in practice of the invention other validations may be performed in addition to, or instead of, the validation described above.

In step 540, the inputted data (e.g., the social security number in this example), is sent to the UI server 40 (e.g., via LAN/WAN 70) for "server-side" validations (step 550). As discussed above, these validations are defined in the model 25 and executed by code generated therefrom by the UI server 40. They can include, for example, a check to insure that the social security number is a string containing exactly nine digits (e.g., in the event that such an error was not caught by the client-side validations in step 530). By way of further example, if the inputted data does fail this validation, or any other validations (e.g., as defined by the model 25 or otherwise), the UI server 40 may generate a server-side exception which can, for example, terminate the current transaction, or it can be sent to the client 30 in the form of a graphical warning (see step 560).

In step 560, a warning is sent from the UI server 40 to the client 30 if an exception (or other type of error) is thrown or detected in the validation step 550. By way of non-limiting example, such an error can be generated as a result of an inputted social security number that is not exactly nine digits in length (e.g., as described above in step 530), or as otherwise required by the model 25. In the illustrated embodiment, the warning can be a pop-up window (e.g., of the type shown in FIG. 3D), etc. In step 570, the client can re-input data (e.g., a new social security number data value) that will be re-validated in step 580 (e.g., as described above in step 550). This process will be repeated until the validation step 580 is successfully completed (i.e., without any detected exceptions or errors).

In step 590, the validated data (e.g., the new social security number data value) is sent to the database server 50 for processing (e.g., via a LAN/WAN connection, cabled connection, etc.). In step 600, the database server 50 processes the transaction, e.g., associates the inputted data value with the social security number attribute of the data identifier (e.g., Customer ID "555555") in the data store 60. This can be accomplished by a variety of techniques pursuant to the data format of the store 60. Thus, for example, SPARQL may be used for an RDF data store, SQL for a relational database, and so forth. In this example, the code (whether SPARQL, SQL, etc.) for associating the inputted data value with the social security number attribute of the specified data identifier (e.g., Customer ID "555555") comprises the code 27 generated by the SEF 23 (as discussed above and shown in FIG. 1) and stored/executed on the database 50, (as discussed above and shown in FIG. 1), although in other embodiments it may be otherwise.

In step 610, the database server 50 returns the result of the processed transaction (e.g., completed, failed, etc.) and the processed data (e.g., a confirmed created data value, a confirmed updated data value, etc.) to the UI server 50. In the illustrated embodiment, failed transactions generate a warning by the database server 50 or UI server 40 (e.g., as described in step 560) that can be sent to the client 30, administrator, other user, etc.

In step 620, the data (e.g., social security number) is sent to the client 30 for display in the UI 32, subject to any constraints defined by the model 25. Thus, as shown here by way of non-limiting example, a masking constraint may be applied to the social security number data value before it is sent to the client 30 for display in the UI 32. In the illustrated embodiment, masking will hide a selected portion of the data value (or the entire data value) on the UI server 40 (i.e., "server-side" masking), and the full data value (e.g., social security number) will never be sent to the client 30 or be displayed in the UI 32. Rather, the UI server 40 will replace selected portions (e.g., one or more characters) of the data value with mask values for display in the UI 32 (e.g., an asterisk for each of the masked characters in the data value). See, e.g., FIG. 3C. Of course, those skilled in the art will appreciate that other types of masking may be applied in this step, as well as other constraints in addition to, or instead of, masking constraints.

Described above are methods and apparatus meeting the desired objectives. Those skilled in the art will appreciate that the embodiments herein are merely examples of the invention and that other embodiments incorporating changes therein fall within the scope of the invention, of which we claim:

The invention claimed is:

1. A digital data processing system, comprising:
   a first digital data processor that when coupled to (i) a second digital data processor and (ii) a data store, coupled to at least the second digital data processor, during operation accesses a model comprising an ontology and a set of constraints that defines how a user of the first digital data processor is allowed to interact with data in the data store, wherein the first digital data processor during operation (i) performs creating, reading, updating and deleting the data from the data store based on code generated from the model and executable by said first digital data processor and (ii) displays a user interface (UI) with masks generated by the second digital data processor that masks, based on one or more constraints defined in the model, a selected portion of one or more data values of the data prior to generation and display of the UI by the first digital data processor.

2. The system of claim 1, wherein the second digital data processor displays a user interface (UI) that performs any of a selected data create, read, update and delete operation.

3. The system of claim 2, wherein the UI is based on code generated from the model by the first digital data processor.

4. The system of claim 2, wherein the UI includes a plurality of data fields, each data field associated with one or more data labels and one or more data values.

5. The system of claim 3, wherein any of the one or more data labels and one or more data values are any of (i) defined by the model, (ii) retrieved by the one or more digital data processors from the data store, and (iii) input by a user.

6. The system of claim 1, wherein the set of constraints include any of security rules, minimum and/or maximum data value character lengths, data value character types, default data values, and field masking.

7. The system of claim 2, wherein the first digital data processor masks a selected portion of one or more data values of the data prior to generation and display of the UI, said masking based on one or more constraints defined in the model.

8. The system of claim 7, wherein the second digital data processor displays a UI that displays portions of the data elements that are not masked.

9. The system of claim 2, wherein the second digital data processor generates a warning in response to user-input entered via the one or more digital data processors.

10. The system of claim 9, wherein the warning is generated in accord with the one or more attributes defined by the model.

11. The system of claim 10, wherein the second digital data processor transmits said warning to a user and/or administrator.

12. A digital data processing system, comprising:
   multiple digital data processors coupled to a data store,
   a model stored in a memory of the one of the digital data processors, wherein the model comprises an ontology and a set of constraints that defines how a user of the first digital data processor is allowed to interact with data in the data store,
   a first of the multiple digital data processors when operating performs (i) creating, reading, updating and deleting data from the data store based on code generated from the model and executable by a second of the multiple digital data processors and (ii) displays a user interface (UI) generated by the second digital data processor that masks, based on one or more constraints defined in the model, a selected portion of one or more data values of the data prior to generation and display of the UI by the first digital data processor.

13. The system of claim 12, wherein the first of the multiple digital data processors includes code generated from the second of the one or more digital data processors to display a user interface (UI) based on the model.

14. The system of claim 13, wherein the UI includes a plurality of data fields, each data field associated with one or more attributes and one or more elements of data in the data store.

15. The system of claim 14, wherein the model defines the one or more attributes, including any of a label, default value, character type, maximum character length, minimum character length, and mask attributes.

16. The system of claim 14, wherein the one or more elements of data associated with each data field are any of (i) defined by the model, (ii) retrieved by the one or more digital data processors from the data store, and/or (iii) input by a user.

17. The system of claim 14, wherein the code generated by the second of the digital data processors to display the UI is capable of generating the UI to display portions of the data elements that are not masked, and does not display the masked portions of said elements.

18. The system of claim 14, wherein the first of the digital data processors generate a warning in response to user-input entered via the first of the digital data processors.

19. The system of claim 14, wherein the warning is generated in accord with the one or more attributes defined by the model.

20. The system of claim 14, wherein the second digital data processors transmits said warning to a user and/or administrator.

21. A digital data processing system, comprising:
one or more digital data processors coupled to a data store,
a model for executing on the one or more digital data processors, wherein the model comprises an ontology and a set of constraints that defines how a user of the first digital data processor is allowed to interact with data in the data store,
the one or more digital data processors when operating executes code, generated from the model by said one or more digital data processors, for (i) creating, reading, updating and deleting data from the data store and (ii) displaying a user interface (UI) generated by one or more of the digital data processors that masks, based on one or more constraints defined in the model, a selected portion of one or more data values of the data prior to generation and display of the UI by the first digital data processor.

22. The system of claim 21, wherein the one or more digital data processors comprise a first digital data processor coupled to a second digital data processor.

23. The system of claim 22, wherein the first digital data processor generates the model from at least an ontology and a set of constraints.

24. The system of claim 23, wherein the second digital data processor generates a user interface (UI) based on the model and code generated therefrom by the first digital data processor.

25. The system of claim 23, wherein the second digital data processor any of creates, reads, updates, and deletes data from the data store based on the ontology.

26. The system of claim 24, wherein the ontology at least defines a structure for data in the data store.

27. The system of claim 22, wherein the second digital data processor masks a portion of data read from the data store based on the set of constraints.

28. A digital data processing system, comprising:
a first digital data processor coupled to a second digital data processor,
a model comprising an ontology and a set of constraints that defines how a user of the first digital data processor is allowed to interact with data in the data store,
the first digital data processor during operation displays a user interface (UI) based on the model and executable code generated therefrom by the second digital data processor,
the UI having a plurality of data fields, each data field associated with one or more attributes and one or more elements of a data record, and
the second digital data processor during operation performs creating, reading, updating and deleting one or more elements of the data record based on UI data field input and generating a user interface (UI) with masks that is displayable by the first digital data processor that masks, based on one or more constraints defined in the model, a selected portion of one or more data values of the data prior to generation and display of the UI by the first digital data processor.

29. The system of claim 28, wherein the model defines the one or more attributes, including any of a label, default value, character type, maximum character length, minimum character length, and mask attributes.

30. The system of claim 28, wherein the one or more elements of a data record associated with each data field are any of (i) defined by the model, (ii) retrieved by the second digital data processor from a digital data store in communications coupling therewith, and/or (iii) input by a user.

31. The system of claim 28, wherein the first digital data processor generates a UI that displays portions of the data record elements that are not masked, and does not display the masked portions of said elements.

32. The system of claim 28, wherein the second digital data processor stores each data record in a data store in communications coupling therewith, said data store specified in the ontology defined in the model.

33. The system of claim 29, wherein the second digital data processor generates a warning in response to user-input entered via the first digital data processor.

34. The system of claim 33 wherein the warning is generated in accord with the one or more attributes defined by the model.

35. The system of claim 33, wherein the first digital data processor displays said warning to a user and/or administrator.

36. A method for generating a user interface (UI), comprising:
generating a model comprising an ontology and a set of constraints that defines how a user of the first digital data processor is allowed to interact with data in the data store, and
displaying a user interface (UI) based on the model and code generated therefrom, wherein the UI includes a plurality of data fields, each data field associated with one or more attributes and one or more elements of a data record, and, based on one or more constraints defined in the model and UI code generated by a second digital data processor, the UI masks a selected portion of one or more data values of the data prior to generation and display of the UI by the first digital data processor, and
executing the code generated from the model to creating, reading, updating and deleting one or more elements of the data record based on UT data field input.

37. The method of claim 36, defining, with the model, the one or more attributes, including any of a label, default value, character type, maximum character length, minimum character length, and mask attributes.

38. The method of claim 36, comprising displaying portions of the one or more elements that are not masked.

39. The method of claim 36, comprising storing each data record in a data store specified in the ontology defined in the model.

40. The method of claim 37, comprising generating a warning in response to user input.

41. The method of claim 40, wherein the warning is generated in accord with the one or more attributes defined by the model.

42. The method of claim 40, displaying said warning to a user and/or administrator.

43. The system of claim 18, wherein the warning is generated in accord with the one or more attributes defined by the model.

44. The system of claim 18, wherein the first code to generate the UI is capable of displaying digital data processors display said warning to a user and/or administrator.

45. A digital data processing system, comprising:
  a first digital data processor coupled to (i) a second digital data processor and (ii) a data store,
  a memory coupled to at least one of the first and second digital data processors, wherein the memory includes a model stored therein and the model comprises an ontology and a set of constraints that defines how a user of the first digital data processor is allowed to interact with data in the data store,
  wherein the first digital data processor during operation performs (i) any of creating, reading, updating and deleting data from the data store based on code generated from the model and executable by said first digital data processor and (ii) displays a user interface (UI) with masks generated by the second digital data processor that masks, based on one or more constraints defined in the model, a selected portion of one or more data values of the data prior to generation and display of the UI by the first digital data processor.

46. The system of claim 45, wherein the second digital data processor displays a user interface (UI) based on code generated from the model by the first digital data processor.

47. The system of claim 46, wherein the UI includes a plurality of data fields, each data field associated with one or more attributes and one or more elements of data in the data store.

48. The system of claim 46, wherein the model defines the one or more attributes, including any of a label, default value, character type, maximum character length, minimum character length, and mask attributes.

49. The system of claim 46, wherein the one or more elements of data associated with each data field are any of (i) defined by the model, (ii) retrieved by the one or more digital data processors from the data store, and/or (iii) input by a user.

50. The system of claim 49, wherein the second digital data processor displays a UI that displays portions of the data elements that are not masked, and does not display the masked portions of said elements.

51. The system of claim 46, wherein the second digital data processor generates a warning in response to user-input entered via the one or more digital data processors.

* * * * *